United States Patent
MacCormack et al.

(10) Patent No.: US 11,179,885 B2
(45) Date of Patent: Nov. 23, 2021

(54) DESKTOP 3-DIMENSIONAL PRINTING APPARATUS

(71) Applicant: MCOR Technologies Limited, Dunleer (IE)

(72) Inventors: Conor MacCormack, Ardee (IE); Fintan MacCormack, Ardee (IE); Mark Boylan, Dublin (IE)

(73) Assignee: MCOR TECHNOLOGIES LIMITED, Dunleer (IE)

( * ) Notice: Subject to any disclaimer, the term of this patent is extended or adjusted under 35 U.S.C. 154(b) by 582 days.

(21) Appl. No.: 15/737,232

(22) PCT Filed: Jun. 16, 2016

(86) PCT No.: PCT/EP2016/063959
§ 371 (c)(1),
(2) Date: Dec. 15, 2017

(87) PCT Pub. No.: WO2016/202957
PCT Pub. Date: Dec. 22, 2016

(65) Prior Publication Data
US 2018/0186068 A1    Jul. 5, 2018

(30) Foreign Application Priority Data

Jun. 16, 2015 (GB) ........................ 1510582
Dec. 23, 2015 (GB) ........................ 1522744

(51) Int. Cl.
*B29C 64/147* (2017.01)
*B29C 64/188* (2017.01)
*B33Y 40/20* (2020.01)

(52) U.S. Cl.
CPC .......... *B29C 64/147* (2017.08); *B29C 64/188* (2017.08); *B33Y 40/20* (2020.01)

(58) Field of Classification Search
CPC ..... B29C 64/147; B29C 64/188; B33Y 80/00; B33Y 99/00; B33Y 40/20
See application file for complete search history.

(56) References Cited

U.S. PATENT DOCUMENTS 6,471,800 B2 * 10/2002 Jang ..................... B29C 64/165
                                                          156/58
6,506,477 B1    1/2003 Ueda
(Continued)

FOREIGN PATENT DOCUMENTS

EP    2141003 A2 *  1/2010   .......... B29C 64/141
EP    2141003 A2    1/2010
(Continued)

*Primary Examiner* — Philip C Tucker
*Assistant Examiner* — Jimmy R Smith, Jr.
(74) *Attorney, Agent, or Firm* — Schwabe Williamson & Wyatt, PC

(57) ABSTRACT

There is provided a method of manufacturing a 3D object from a plurality of media layers including processing a media layer to define a layer of the 3D object, said processing including: cutting the media layer to define the profile of the layer; printing the media layer to define the colour of the layer. The processing including the cutting and printing of the media layer is done in a common reference plane and a plurality of media layers are processed and assembled at the build location to form the object.

20 Claims, 11 Drawing Sheets

(56) References Cited

U.S. PATENT DOCUMENTS

| | | | | |
|---|---|---|---|---|
| 6,713,125 | B1* | 3/2004 | Sherwood | B29C 71/0009 427/157 |
| 9,630,365 | B2* | 4/2017 | Frayne | G06T 11/00 |
| 2002/0167101 | A1* | 11/2002 | Tochimoto | B29C 64/112 264/40.1 |
| 2007/0146734 | A1* | 6/2007 | Taniuchi | B33Y 30/00 358/1.1 |
| 2011/0222081 | A1 | 9/2011 | Yi | |

FOREIGN PATENT DOCUMENTS

| | | |
|---|---|---|
| EP | 2141003 A3 | 10/2010 |
| WO | 96/11117 | 4/1996 |

\* cited by examiner

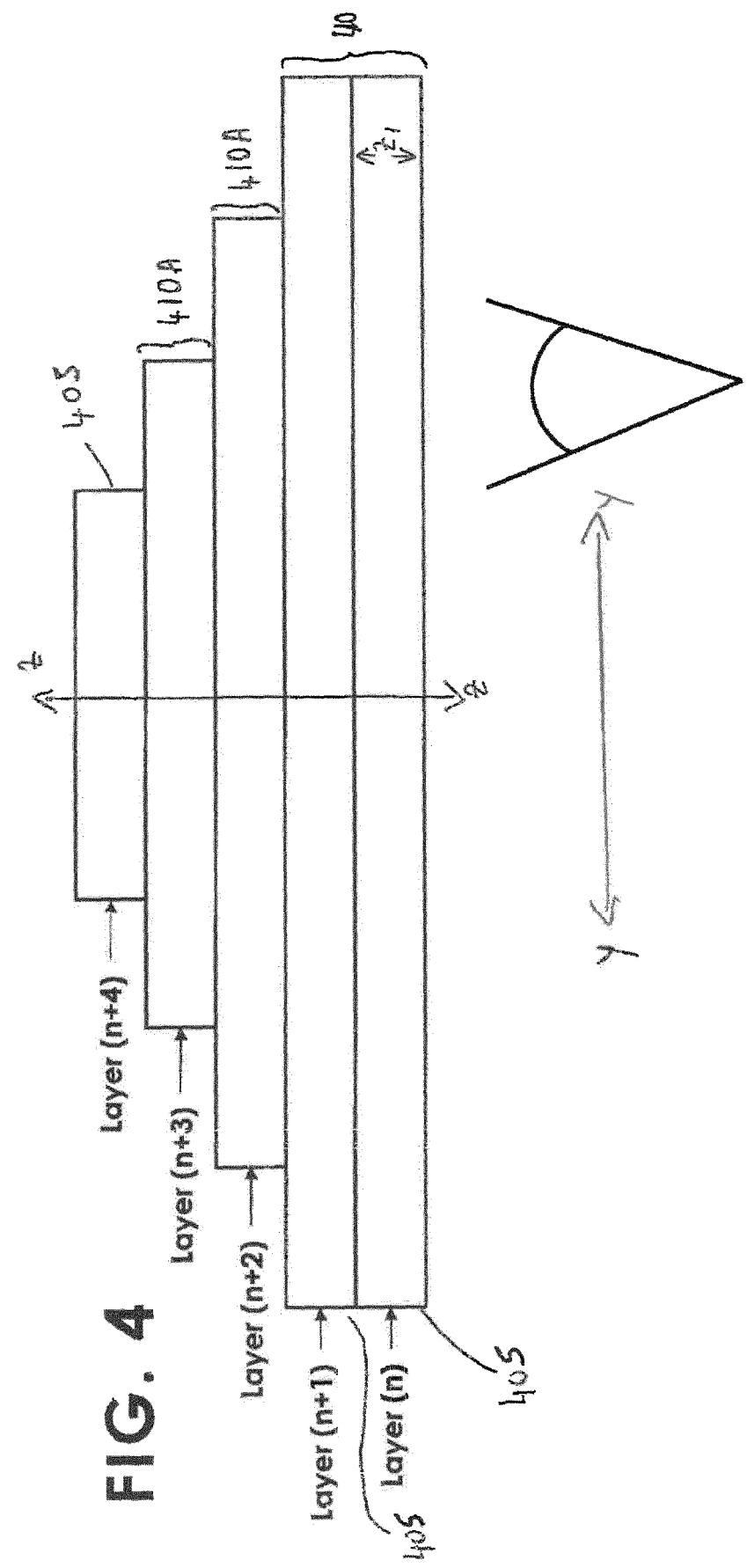

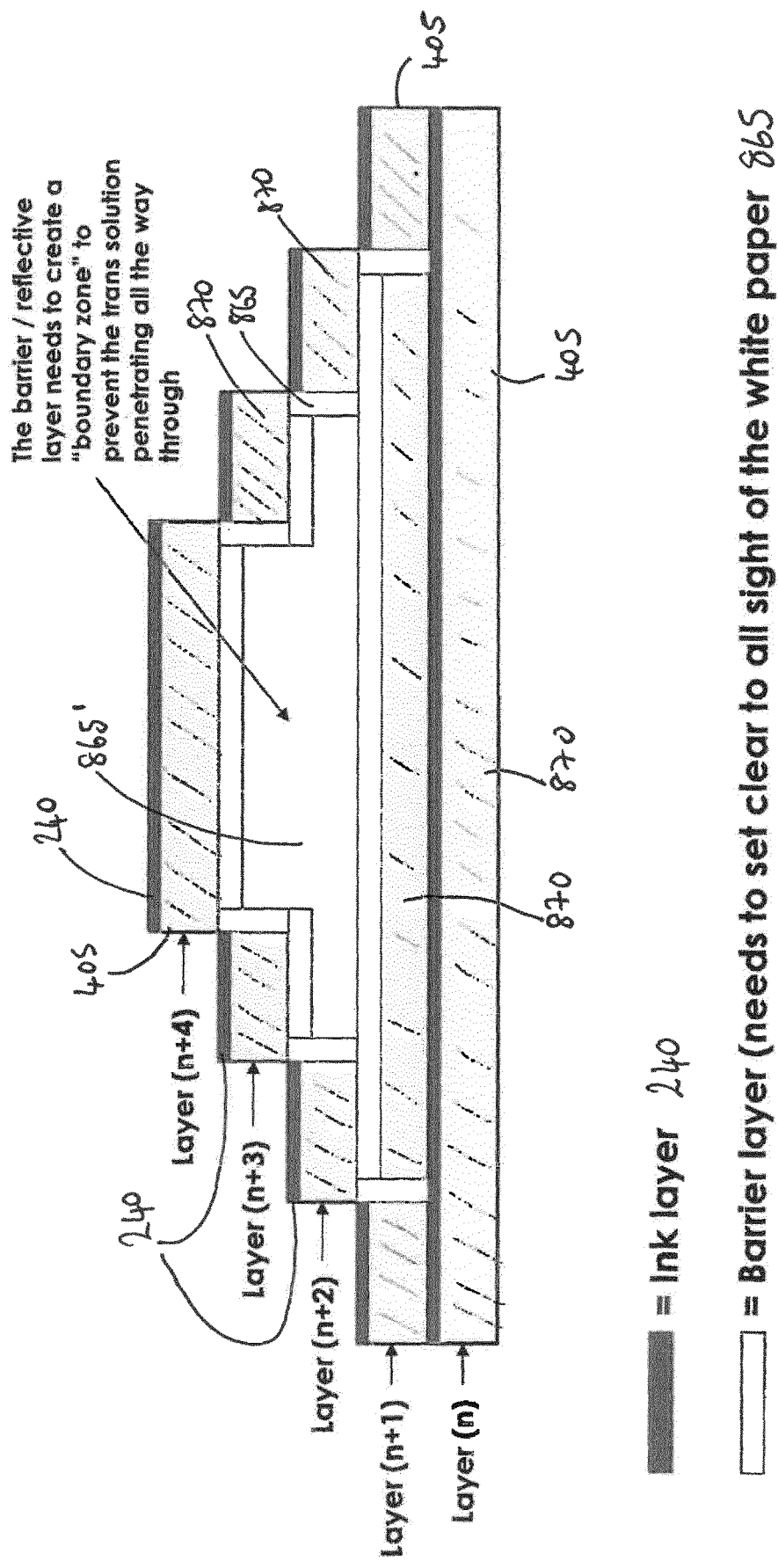

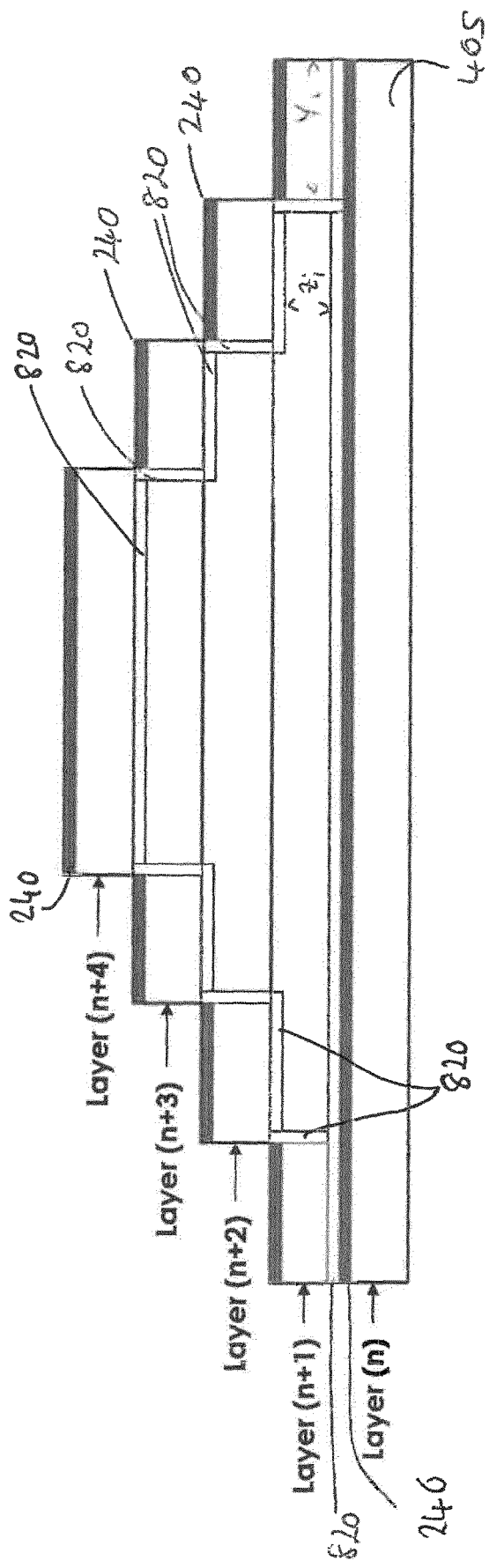

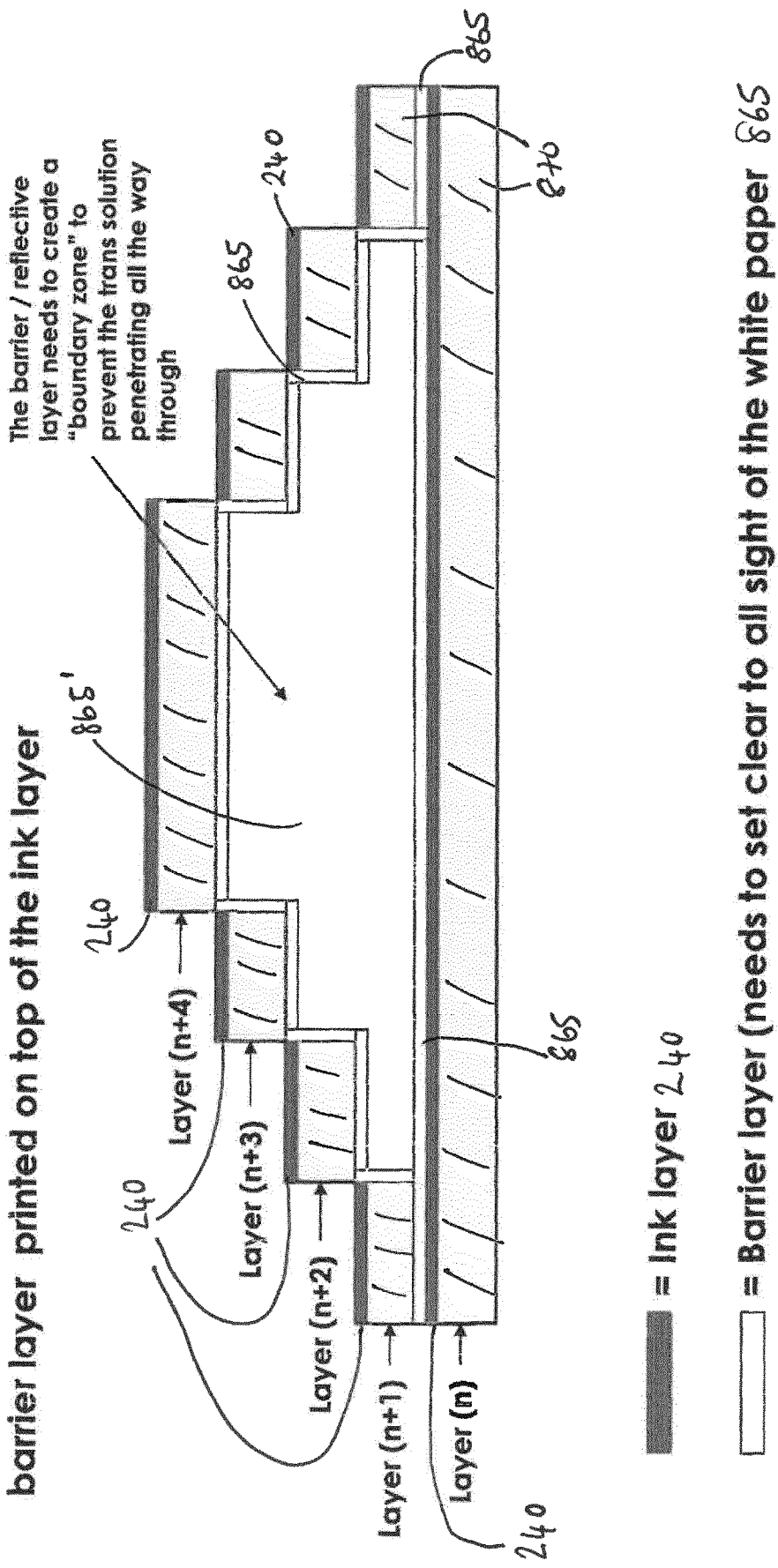

DESKTOP 3-DIMENSIONAL PRINTING APPARATUS

CROSS-REFERENCE TO RELATED APPLICATION

The present application is a national phase entry under 35 U.S.C. § 371 of International Application No. PCT/EP2016/063959, filed Dec. 16, 2016, entitled "DESKTOP 3-DIMENSIONAL PRINTING APPRATUS," which designates the United States of America, which claims priority to GB Application No. 1510582.8, filed Jun. 16, 2015 and GB Application No. 1522744.0, filed Dec. 23, 2015, the entire disclosures of which are hereby incorporated by reference in their entireties and for all purposes.

FIELD

The present application relates a desktop apparatus that integrates 2-D and 3D printing to form a 3D object.

BACKGROUND OF THE INVENTION

Rapid prototyping is defined as computer-controlled additive fabrication, in that an object can be fabricated by the addition of material rather than conventional machining methods that rely on removal or the subtraction of material. The term "rapid" is, it will be appreciated, a relative term but one that has specific meaning within the art, in that construction of a finished three dimensional articles can take from several hours to several days, depending on the method used and the size and complexity of the model. There are many known methodologies that are employed within the general field of rapid prototyping Layered Object Manufacture (LOM) is one form of Rapid prototyping (RP) which relates to the successive layering of adhesive-coated paper, plastic, or metal laminates which are then successively glued together and cut to shape with a knife or laser cutter.

LOM, similarly to other rapid prototyping techniques, conventionally involves the use of a three dimensional (3D) computer aided design (CAD) of an object/part to be made, from which a stereolithography (STL) or other suitable format file is generated within a CAD package. The STL file is processed and in effect virtually sliced in the Z-axis at a thickness matching the thickness of the substrate material used. This creates a series of cross sections of the part and at any particular height each one has a simple two dimensional (2D) profile. A profiling, or cutting, apparatus may be used to trace the 2D profiles and thus cut the shapes onto thin sheets of raw material. In LOM, each individual thin sheet may be stacked and bonded one on top of another to produce a finished 3D object. After a plurality of media object layers are formed, a profiling and layer bonding process is performed. The plurality of layers are bonded together, and then a profiling or weeding process is performed which comprises removing unwanted support material from the printed media stack to reveal the 3D printed object. The order of the profiling, stacking and bonding processes may be interchanged. The individual layers may also be printed using conventional 2D printing processes. The layers may be singly or duplex printed, and printed either in a single colour such as with black ink, or colour printed with a plurality of colours. In addition multi-coloured paper may be used.

In LOM manufacturing, typically a finished 3D object is formed from a stack of individual media layers which are assembled and profiled to form the desired final geometrical shape. The individual media layers may be printed or otherwise treated prior to the assembly stage of the manufacturing.

Accordingly, a plurality of 3D object media layers may be printed in preparation for forming the finished 3D printed article. The entire layer stack for the 3D printed article may be pre-printed off-line in the printing module, after which the printed stack may be loaded into the profiling and layer bonding module where each printed layer may be profiled and bonded to complete the fabrication of the 3D printed article.

Problems may arise in terms of alignment of the images printed on the opposite sides of the printed media layers in preparation for the collation and assembly into the final 3D object. Problems may also arise if the printed sheets provided as input to a 3-D printer are not in the correct order. Some printers can be used to manufacture parts in colour. In one approach, for example, coloured sheets may be used. In another approach, for example, a coloured ink may be printed onto each sheet of paper or an image may be printed onto each sheet and the printed sheets may then be loaded into the section of the printer where the cutting and gluing occurs.

It will be appreciated that use of coloured sheets and/or inks and printing of images may add further complexity to the 3D printer machine and/or processes.

Considerations in choosing a 3D printing machine include speed, choice of materials and colour capabilities, quality of the final product, precision of printing.

The use of paper in SDL has brought down the cost of raw materials, but there remains a need to develop a printer having improved efficiency of operation, precision, flexibility and to provide an improved quality colour object, as required.

There are therefore a number of issues with 3D printing processes and systems for rapid prototyping that need to be addressed. The present application is aimed at providing an improved method of manufacturing coloured objects. The present specification is aimed also at providing and improved 3D printing system.

SUMMARY

According to the specification there is provided a method of manufacturing a 3D object from a plurality of media layers comprising:
 processing a media layer to define a layer of the 3D object, said processing including:
 cutting the media layer to define the profile of the layer;
 printing the media layer to define the colour of the layer;
 wherein the processing including the cutting and printing of the media layer is done in a common reference plane,
 wherein a plurality of media layers are processed and assembled at the build location to form the object.

In one arrangement printing the media layer comprises printing one side of the media layer. Printing the media layer may comprise applying ink to the upper surface of the media layer. In one arrangement printing the media layer comprises applying ink to the media layer in the same reference plane as the cutting the media layer to define the profile.

Advantageously, the processing of the media layer comprising cutting and printing the media layer using a common set of reference points or a common reference point or datum point. The processing of the media layer may comprise cutting and printing the last media layer applied to the build in situ at the build location. The cutting and printing of a media layer accordingly may be completed in a single reference plane. The method provides that each media layer may be processed in turn at the location where added to the build in the build chamber. The printing may comprise applying ink relative to the cutting of the profile. Ink may be applied to the media layer in the same plane as the profile is cut The method may further comprise bonding the media layer to the build before cutting and printing the media layer. The processing including where applicable profiling, cutting and bonding may be done in one reference plane. The processing may further comprise applying adhesive to the media layer. Adhesive may be applied to the media layer in the same reference plane as the cutting and printing. The cutting may comprises cutting an external profile. The cutting may further comprise cutting an internal profile Advantageously, all sheet layer profiling operations (i.e. adhesive application, colour printing, profile cutting, sheet lamination and waste sheet removal) are carried out in one common reference plane. This provides for multiple processes in relation to a single sheet before moving on to perform multiple processes in relation to the following sheet.

The application of ink to the media may layer comprise applying ink to selected portions of a media layer. The application of ink to the media layer may comprise applying ink in a first direction namely to the surface of the media layer (X-Y plane/upwardly facing surface). The media layer comprises a longitudinal cross section defined by the surface of the media layer and a lateral cross-section defined by the thickness or depth of the media layer. The application of ink is controllable to control the volume and depth of ink in a first longitudinal or direction and/or in a second lateral direction of a media layer. Ink may be applied to define a layer of ink in the direction of the plane of the media layer or parallel to the plane of the media layer. Applying ink to the media layer may comprise applying ink in a second direction substantially at right angles to the first direction. Applying ink to the media layer comprises applying ink to the cut edges of the media layer. Ink may be applied to define a band of ink across a lateral cross-section (through the depth or thickness or a portion of the depth or thickness) of a media layer. The applying ink to the media layer may comprise controlling the location and volume of ink applied to a particular or selected portion of the media layer. The method may further comprise modifying ink and/or modifying the medium to vary the printing or colour. In one arrangement, the absorbency of the media layer may be modified. In another arrangement the properties of the ink may be modified. In effect printing may be controlled and varied to achieve the final product in accordance with colour requirements.

In one arrangement, the method may further comprise creating a barrier layer at selected portions or locations of a media layer. A barrier layer may be created by controlled application of a barrier material or reflective material. A barrier layer may be created by controlled application of an epoxy material. Preferably a barrier layer or reflective layer adjacent a layer of ink. The relative locations of the ink and, a barrier layer on a media layer are selected and controlled to produce the final object having a colour and appearance, as required. The method may further comprise applying a surfactant to a media layer. The method may further comprise providing a medium pre-treated with a surfactant. The method may further comprise applying a transparency treatment to render selected portions of media layers of the object transparent. The transparency treatment may be applied by spraying or dipping the object in a transparency material. The barrier layer defines a boundary layer and a resultant boundary zone.

In one arrangement the barrier layer defines a barrier to the transparency treatment. In another arrangement the transparency treatment is configured to penetrate through a predefined depth of a media layer or media layers.

The external profile of a layer may define portions of the layer to be printed. The internal profile of a layer defines portions of the layer to be printed.

The 3D object manufactured in accordance with method of the specification comprises a plurality of media layers and a media layer may defines an external layer or external surface of an object in which case ink may be printed or applied across the surface of the media layer. Alternatively a media layer may define an intermediate layer such that only edge portions of the media layer define a surface of an object in which case ink may be applied or printed to portions of the media layer proximal the external and internal profiles.

In one arrangement each media layer may be cut from a medium provided in roll form. In which case in one arrangement only the external profile of a media layer is cut from the medium roll. In another arrangement, the external profile plus a margin may be cut from the medium roll. When a media layer is cut from the medium provided in roll form, the medium is transported to remove waste, the remaining material or the medium, and to allow for the next media layer to be cut from the medium. The size and form of each media layer may be varied depending on form of the object and/or as defined by cutting the profile. This advantageously provides for as reduction in waste material. This advantageously also provides for a reduction in processing of the media layer, in that only those It will be appreciated that in an alternative arrangement a media layer may be cut from a medium provided in sheet form. In which case in a preferred arrangement the external profile of a media layer is cut from the sheet and the waste material is transport from the build location. In an alternative arrangement the external profile plus a margin may be cut from the medium. The size and form of each media layer may be varied depending on form of the object and/or as defined by cutting the profile.

Preferably the 3D object is formed by selective deposition lamination (SDL).

Advantageously, the methods of the present specification provide for individual media layers of an object to be processed at the build location separately in turn. There are advantages including reduction in control and processing requirements associated with processing of each media layer separately in a single pass. There is also a reduction in the number of time a layer must be presented for processing. There is an attendant increase in quality and precision.

According to another aspect there is provided a 3D printing system for processing a plurality of individual media layers to form a three-dimensional (3D) object,
the system including a build module defining a build location for processing a media layer to form a layer of the object,
wherein the system comprises
cutting means for cutting the profile of a media layer at the build location, and
printing means for printing a media layer at the build location to define the form and colour of a layer of the object
adhesive application means for applying adhesive to a media layer at the build location wherein each media layer is processed at the build location said build location defining a common reference plane for the processing of a media layer.

Preferably, the 3D object is formed by selective deposition lamination (SDL).

The system may further comprise bonding means for bonding a media layer to the build object at the build location, the bonding means comprising a plate or roller.

The system provides for a plurality of media layers to be processed in turn or in succession at the build location to define a plurality of layers of the object being built.

The system may include transport means for transporting the medium to the build location for cutting the profile of a media layer from the medium.

The cutting means is configured to cut the external profile of a media layer. The system may comprise an adaptive build means wherein the external profile of a media layer cut from the medium varies adaptively depending on the dimensions and form of the layer of the object being built. The cutting means may be configured to cut the internal profile of the media layer from a medium. The build module may further comprise barrier layer application means for creating a barrier layer as required at selected portions of a media layer. The system may further comprise a controller to control the profile and/or printing and/or creating a barrier layer in a media layer. The printing means may be configured to print a media layer in a first direction to apply ink to a portion of the surface of the media layer. The printing means may be configured to print a media layer in a second direction substantially at right angles to the surface of the media layer. The printing means may configured to print the cut edges of a media layer. The surface may be printed in first direction and the cut edges in a second in second direction. The system may be configured such that each media layer may be processed in turn at the build location to define shape and/or form and/or colour of a layer of the object.

According to another aspect there is provided a method of building a 3D object manufactured by processing a plurality of individual media layers,
the processing of each media layer comprising
    providing an apparatus as claimed in any preceding claim
    transporting a medium to a build object at a build location in build chamber
    pressing the medium to the build object using heat plate or pressure roller to bond medium to previous media layer N to which adhesive has been applied,
    cutting the profile of the media layer N+1 in the medium
    applying adhesive to media layer N+1
    repeating processing for each of the media layers of the object, wherein each media layer is processed in a common reference plane.

The processing of each media layer may further comprise printing media layer N+1.

The method may further comprise applying a transparency treatment 850 to render selected portions of media layers of the object transparent.

The processing of each media layer may further comprise creating a barrier layer in a media layer. The barrier layer may define a barrier to the transparency treatment.

In another arrangement the transparency treatment may be configured to penetrate through a predefined depth of a media layer or media layers.

The 3D object is formed by selective deposition lamination (SDL).

The medium 401 may comprise a medium in roll form and cutting the profile of the media layer may comprise cutting the external profile of the media layer from the medium. The profile of each media layer cut from the medium is different depending on the profile of the layer of the object. The method may provide for an adaptive build, each media layer being cut to define the profile of a layer of the object.

After the profile of a media layer (or profile plus margin) is cut from the medium, the remaining waste cut of the medium is transported away from the build chamber-printing media layer N+1 as a new portion of the media layer is delivered to the build chamber for cutting.

In another aspect there is provided a method of manufacturing a 3D object comprising a plurality of media layers wherein each media layer is processed to define a layer of the object,
the processing of each media layer to define a layer of the object including:
    bonding the layer to a preceding layer or base layer of the object
    cutting the profile of the layer
    applying adhesive
repeating the processing of each successive layer until the object is formed, and further including applying a transparency treatment to render selected portions of a layer or layers of the object transparent.

In a further aspect there is provided a method of treating to a 3D object to render selected portions of a layer or layers of the object at least partially transparent, the 3D object comprising a plurality of media layers of paper material and the method comprising:
    applying a transparency treatment material to the at least selected portions of the object, the transparency treatment material configured to penetrate through a predefined depth of a media layer or media layers wherein as the transparency treatment material is absorbed into the media layer the media layer is rendered transparent.

The transparency treatment material may comprise a refractive index-matching material. The transparency treatment material may comprise triglyceride-based oils, such as drying, cooking, nut, citrus, medicinal oils. The transparency treatment material may comprise synthetic polymer-based materials such as acrylics and polyurethanes.

The transparency treatment material preferably having a refractive index as close as possible to that of cellulose (1.55 at 592 nm).

The method may further comprise controlling the depth of penetration to which the transparency treatment material is absorbed into the object. The depth of penetration may be controlled to maintain the white point of the finished build model object and provide CMYK colours, as required.

The method may further comprise creating a barrier or boundary layer to limit penetration of the transparency treatment material. The method may further comprise creating a boundary layer comprises applying a reflective material or barrier material. The reflective or barrier material may be applied to each layer.

In a still further aspect there is provided a method of treating to a 3D object to render selected portions of a layer or layers of the object at least partially transparent, the 3D object comprising a plurality of media layers of paper material and the method comprising: applying a transparency treatment material to the at least selected portions of the object, the transparency treatment material configured to penetrate through a predefined depth of a media layer or media layers wherein as the transparency treatment material is absorbed into the media layer the media layer is rendered transparent.

The transparency treatment material may comprise high molecular weight materials which will preferably having a refractive index as close as possible to that of cellulose (1.55 at 592 nm).

The transparency treatment material may comprise synthetic polymer-based materials such as acrylics, polyurethanes and epoxy resins. In the case of epoxies, a separate hardener/cross-linker material may be required.

The method may further comprise controlling the depth of penetration to which the transparency treatment material is absorbed into the object. The depth of penetration may be controlled to maintain the white point of the finished build model object and provide CMYK colours, as required.

Control of the penetration depth may be achieved by a fast-cure solution, such as UV curing. This curing method does not involve ambient solvent evaporation, and materials can dry under a UV lamp in significantly less time than it takes for solvent-based resins & adhesives. In addition to fast curing times, UV-based resins do not contain VOC's (volatile organic solvents), which results in a much more facile processing solution.

The method may further comprise creating a barrier or boundary layer to limit penetration of the transparency treatment material. The method may further comprise creating a boundary layer comprises applying a reflective material or barrier material. The reflective or barrier material may be applied to each layer.

The barrier material may comprise an epoxy resin. The barrier material may further comprise a cross-linking agent.

In the method the processing of each media layer to define a layer of the object may further comprise printing the media layer to define the colour of the layer of the object.

According to another aspect there is provided a method of forming a transparent 3D object, the method including:
  providing a 3D object, the 3D object comprising a plurality of media layers assembled together to form the object, wherein the media layers are of a porous material;
  providing a transparency treatment emulsion;
  applying a transparency treatment emulsion to the object or portions of the object to render the object or portions of the object transparent.

The media layers may be of paper. The media layers may be of a porous material not paper. The transparency treatment emulsion may be configured as an infiltrant material. The porous material of the media layers may be configured to act as a scaffold for the transparency treatment emulsion enabling it to absorb and take on the properties of the infiltrant material. The transparency treatment emulsion may be formulated to penetrate through a predefined depth of a media layer or media layers of the object. The properties of the object or media layers of the object may be controlled to control absorbency of the transparency treatment emulsion into the object. The properties of the object or media layers of the object may be controlled to control penetration of the transparency treatment emulsion into the object. The transparency treatment emulsion may be applied by spraying the transparency treatment emulsion onto the object, or, by immersing the object in the transparency treatment emulsion.

According to a further aspect there is provided a method of forming an at least partially transparent 3D object comprising a plurality of media layers wherein each media layer is processed to define a layer of the object, the processing of each media layer to define a layer of the object including:
  cutting the profile of the layer
  applying adhesive
  bonding the layer to a preceding layer or base layer of the object repeating the processing of each successive layer until the object is formed, wherein the media layers are of a porous material,
  further including applying a transparency treatment emulsion to render selected portions of a layer or layers of the object transparent.

The media layers may be of paper or wherein the media layers are of a porous material not paper; and the porous material of the media layers is configured to act as a scaffold for the transparency treatment emulsion enabling it to take on the properties of the transparency treatment material. The transparency treatment emulsion may be configured as an infiltrant material. The transparency treatment emulsion is formulated to penetrate through a predefined depth of a media layer or media layers of the object. The properties of the object or media layers of the object may be controlled to control:
  absorbency of the transparency treatment emulsion into the object, or
  penetration of the transparency treatment emulsion into the object.

The properties of the object or media layers of the object may be controlled to control penetration of the transparency treatment emulsion into the object. The transparency treatment emulsion may be applied to the object or selected portions of the object after the object has been built. The transparency treatment emulsion may be applied by spray application or by immersing the object in the emulsion.

According to a further aspect a method of treating to a 3D object, the 3D object comprising a plurality of layers of a paper material, to render selected portions of a layer or layers of the object at least partially transparency,
  the method comprising:
  providing the 3D printed object and a transparency treatment emulsion;
  applying the transparency treatment emulsion to at least selected portions of the object, the transparency treatment emulsion configured to penetrate through a predefined depth of a media layer or media layers of the object wherein as the transparency treatment emulsion is absorbed into a media layer the media layer or portions thereof are rendered transparent.

The transparency treatment material of the above noted aspects may comprise a refractive index-matching material. The transparency treatment material may comprise triglyceride-based oils, such as drying, cooking, nut, citrus, medicinal oils. The transparency treatment material may comprise synthetic polymer-based materials such as acrylics and polyurethanes. The transparency treatment material may be a material having a refractive index as close as possible to that of cellulose (1.55 at 592 nm).

The method of the above aspects may further include controlling the depth of penetration to which the transparency treatment material is absorbed into the object. The depth of penetration may be controlled to maintain the white point of the finished build model object and provide CMYK colours, as required. The methods of the above aspects may further comprise creating a barrier or boundary layer to limit penetration of the transparency treatment material. Creating a boundary layer may comprise applying a reflective material or barrier material. The reflective or barrier material may be applied to selected layers or portions of layers. The barrier material may comprise an epoxy resin. The barrier material may further comprise a cross-linking agent. The processing of each media layer to define a layer of the object may further include printing the media layer to define the colour of the layer of the object.

According to another aspect there is provided a 3D object manufactured in a layered object manufacture process, the layers comprised of a porous material bonded by adhesive, wherein the object is treated using a transparency treatment material absorbable into the porous material to render the object or portions thereof transparent. The 3D object may be manufactured in an SDL process.

BRIEF DESCRIPTION OF THE DRAWINGS

The present application will now be described with reference to the accompanying drawings in which:

FIG. 4 is an illustration showing an enlarged cross-sectional side view of the a number of media layers of a build object in particular showing boundary of the media layers and edges of media layers according to an embodiment of the present specification;

FIGS. 5A, 5B, 5C and 5D is an illustration showing an enlarged cross-sectional views of the a number of media layers of a build object in particular showing exemplary arrangements of how ink and/or a barrier or reflective material may be controllably applied to one or more of the media layers and edges of media layers according to an embodiment of the present specification; Referring to FIG. 5A, in the exemplary arrangement shown, the barrier/reflective layers are applied adjacent the printed ink regions; FIG. 5B is an illustration of the "boundary zone" created by the application of the barrier layer/reflective layer to prevent the trans solution penetrating all the way through after the post-treatment step; Referring to FIG. 5C, a further exemplary arrangement is shown, in this exemplary arrangement the barrier/reflective layers are applied including to printed ink regions; FIG. 5D is an illustration of the "boundary zone" created by the application of the barrier layer/reflective layer to prevent the trans solution penetrating all the way through after the post-treatment step;

DETAILED DESCRIPTION OF THE DRAWINGS

Exemplary arrangements of a desktop printing apparatus that uses Selective Deposition Lamination (SDL) in accordance with the present teaching will be described hereinafter to assist with an understanding of the benefits of the present teaching. Such arrangements will be understood as being exemplary of the type of apparatuses that could be provided and are not intended to limit the present teaching to any one specific arrangement as modifications could be made to that described herein without departing from the scope of the present teaching.

The present specification provides an SDL desktop apparatus that integrates colour or image printing and 3D printing. The apparatus 100 is configured to print and assemble a plurality of individual media layers to form a three-dimensional (3D) object or part. Within the context of the present teaching, the individual media layers may be considered distinct physical elements or entities. Within the context of the present teaching the individual media layers are drawn or obtained from an input comprising a roll of medium.

Figure 1A:
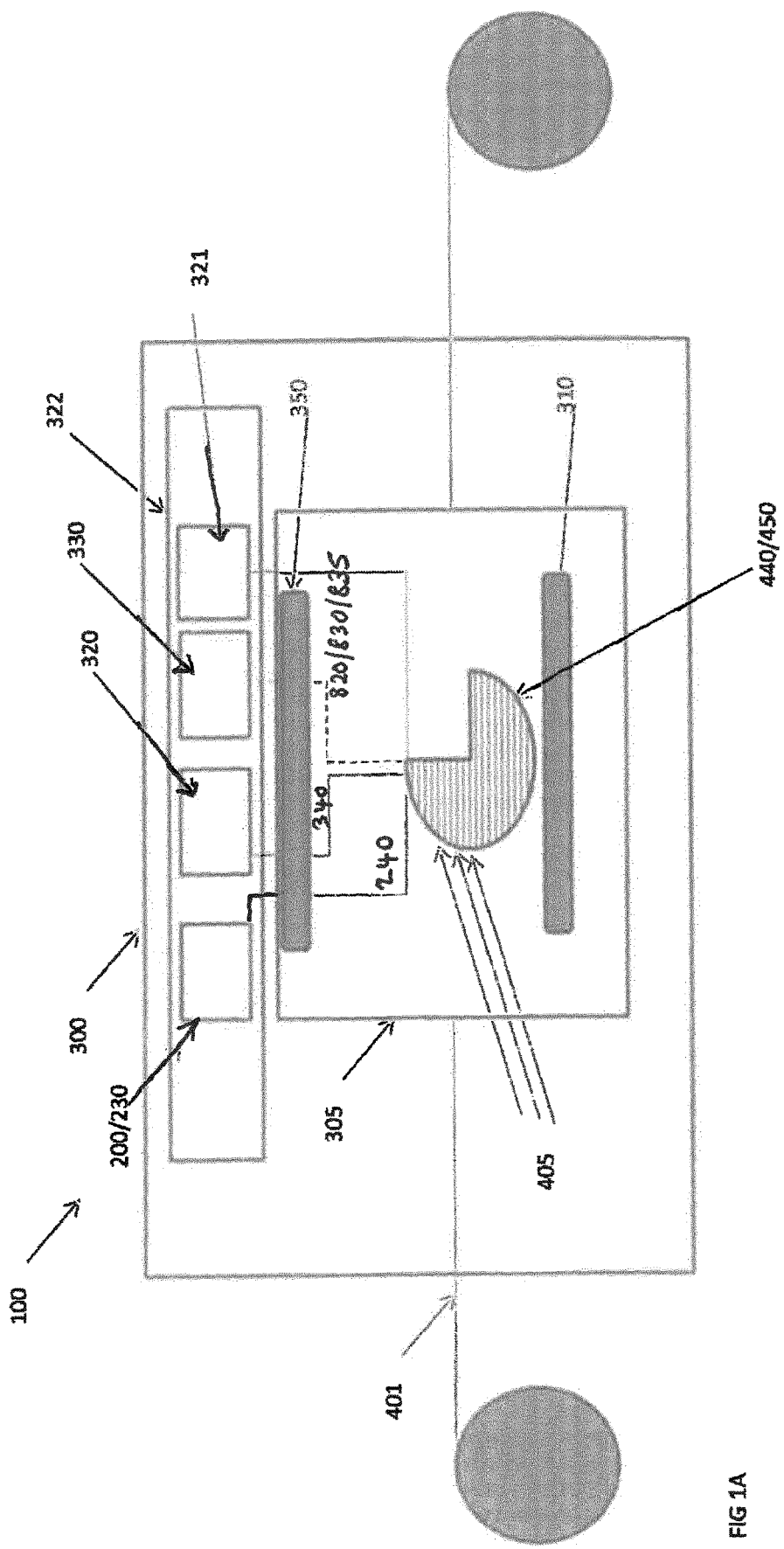
FIG. 1A is a block diagram of a printing apparatus according to an embodiment of the present teaching.

Referring to the drawings and initially in particular FIG. 1A a desktop SDL apparatus 100 according to the present specification is described. The desktop SDL apparatus (3D printing apparatus) 100 comprises a build module 300 configured to process and assemble a plurality of the individual media layers to form the 3D object. The build module 300 includes a build chamber 305 and a build plate 310. The build module 300 includes bonding means. The bonding means may comprise a fixed or movable heat plate 350 or roller 355. The build module 300 is configured to successively bond individual of the plurality of media layers 405 to the part 450. The build module 300 is further configured to cut the profile of an individual media layer to define a layer of the object or part. The build module includes profile cutting means 321 and adhesive application means 320. The build module 300 further includes a printing means 200 having a print head 230. The print means 200 is configured to print a media layer defining a layer 405 of an object or part 450.

The processing means 300 of the exemplary arrangement includes printhead, cutting/profiling means and adhesive application means arranged to move about and operate in a space about the build plate. It will be appreciated that a suitable mounting/transport arrangement may be provided for example an X-Y frame arrangement. The printhead and/or cutting profiling means and/or adhesive application means may be mounted to a common multifunctional head 322. It will be appreciated that alternatives may be provided, for example, the build plate may be configured to move relative to the processing means.

In the specification the build module describes the module of the 3D printing apparatus at which the layered objects or parts 450 are processed and assembled to form the 3D object. The terms build module, collator module, build chamber, build plate and build module, SDL build module have variously been used to describe this feature. Similarly, the terms 3D printing and SDL and manufacture of the 3D object have been used to describe the 3D printing process. The terms 3D object, build object and part have been used to describe the object formed in the 3D printing or SDL process.

In operation the individual media layers 405 are provided to apparatus 100 to form the object. The media layers 405 are drawn from a medium 401 transported to the build plate 310. The object 450 as it is being built may be referred to as the build 440. Media layers 405 are added individually on a layer by layer basis, (see for example FIG. 4 which shows an enlarged view of a layer arrangement) layer N+1 being laid on top of layer N which in turn was laid on top of layer N−1. Individual media layers are processed in turn to form the layers of the object 450. Media layers 405 (N, N+1 etc.) are treated or processed on an individual or layer by layer basis at the build plate 310.

Media layers 405 in the exemplary arrangement described are drawn from a medium 401 provided in roll 400 form. The media layers are provided to the desktop apparatus 100 to be printed, profiled and bonded, thereby producing a completed colour 3D object or part. In a preferred arrangement the individual media layers of the 3D object may be derived from a roll input.

Processing includes processing media layers. The media layer which in the exemplary arrangement is of a paper material having X-Y and Z dimensions as illustrated. Processing includes: profile cutting, printing, bonding, applying adhesive to a media layer—in the exemplary arrangement the last provided or uppermost media layer. The media layer is processed in the build module at the build location. The various processing operations are performed in the plane of the media layer. It may be considered that the processing of a media layer to form or define a layer of the object is performed in a single plane of reference or in a common reference plane using common reference points. Processing of a media layer may further include creating a barrier layer, including for example, applying a barrier material or reflective material. The build module 300 includes cutting means, adhesive application means, bonding means. The build module may further include application means 330 for creating a barrier layer—for example epoxy or barrier material or reflective material application means.

In comparison with approaches of the prior art—the system and method of the present application provide that the processing of each layer is done in a common reference plane. This is in contrast with the prior art—in which the sheets may have been printed at a 2D printer, provided individually to a cutter for profiling and then assembled at a separate location to form the 3D object. In such an arrangement, each media layer may have been presented for processing on three or 4 separate occasions in turn. Once or twice to the printer—depending on whether the media layer was printed on one or both sides—again to the cutter—and again to the collator for bonding.

The arrangement of the present system and method which provides for each media layer to be processed in a single pass or in a common reference plane reduces the need for handling and delivering a media layer on a number of separate occasions for processing and reduces the attendant additional processing and handling requirements. While the prior art approach presented risks of a loss of precision and misalignment—the arrangement of the present system and method addresses these issues.

The processing of a media layer to define a layer 405 of the object in a single pass or in a common reference plane may include the printing, profiling, creating a boundary layer and application of adhesive.

In the exemplary arrangement, the common reference plane in which the media layer is processed is the plane of the media layer or sheet. In the exemplary arrangement, the media layer to be processed may be bonded to the build before processing.

Referring to FIG. 4, layers 405 (N, N+1 etc.) of the object 450 are processed during the build by surface treatment of individual layers. A media layer may for example form an external layer of a final object in which case a relatively large proportion of a surface of the layer 405 may be exposed in the final object. Alternatively a media layer may for example form an intermediate layer of a final object in which case, only the cut edges or lateral cross-section of the cut edges may be exposed in the final object. The processing of a media layer 405 may be controlled and varied depending on whether the layer is to be an intermediate or external layer of the object. Different processing options are described in further detail below with reference to FIG. 5.

The printing module 200 is provided integrated to the build module 300. The printing module 200 is configured to print at least a portion of a media layer at the build location. The printing module 200 may be configured to apply multiple colours to one or more of the plurality of individual media layers. The media layers may be printed with a single black ink 240, or colour printed with a plurality of colours 240 or no colour—i.e. white. The print module 200 may be further configured to print a media layer after it has been cut or profiled from medium 401. The printing module may comprise a conventional 2D printer configured to apply the ink to the media layer. The 2D printer may be a standard inkjet printer. The printing module 200 may be configured to print on a first side or surface of a media layer 405. The printing module may be configured to print on other surfaces of a media layer.

An image 600 printed on a media layer N or media layer 405 may be printed in accordance with a pre-generated digital print file containing image, profile and colour information for the 3D object to be printed. Steps in an exemplary arrangement of pre-generating a digital print file are briefly explained herein, however, it will be appreciated that alternative methods may be provided. As is known in the art, 3D printing starts with a 3D data file, which is representative of the 3D object to be printed. For example the universal industry standard file format for 3D product designs, STL, as well as OBJ and VRML (for colour 3D printing) can be used with the present teaching, however, it will be appreciated that suitable alternatives may also be used. Colour is then generated and applied to the model represented in the data file. The data in such files is read and the computer model is sliced into printable layers equivalent in thickness to the media layer. Such generation of the data file usually takes place at a PC or computing device connected to the printer 100 however this should not be interpreted as limiting as such processing may also take place in the printing apparatus 100. It will be appreciated that in alternative arrangements the slicing could be performed in the cloud, or on a mobile device, tablet, phone. Furthermore the present teachings are not limited to the above method of file generation and any suitable method of generating 3D print files may be used.

The pre-generated file is provided or otherwise loaded to the printing apparatus 100 prior to beginning the print job and SDL job—although not shown, the printing apparatus 100 includes a processor or controller and as well as memory onto which the print file is loaded.

The digital print file is again referenced or read by the controller/processor. The digital print file may comprise a series of images 600 for each media layer 405 (N, N+1 etc FIGS. 4 and 5). Colour image information for all media layers is also contained in the digital print file.

Similarly, a profiling file is provided including details of the profiles to be cut to define a layer of an object. It will be appreciated that a layer may include an external or outer edge profile. It will be appreciated that a layer may further include one or more internal edge profiles.

In the exemplary arrangement of FIG. 1, the printing module 200 and the build module 300 are co-located and integrally arranged within the apparatus 100 such that individual media layers transported to the build module may be completely processed at the build location. A media layer transported to the build module is profiled and printed to define a layer of the object being built. The individual media layers are profiled, printed, collated and bonded at the build location. The build module 300 also includes cutting means, bonding means and adhesive application means.

Figure 1B:
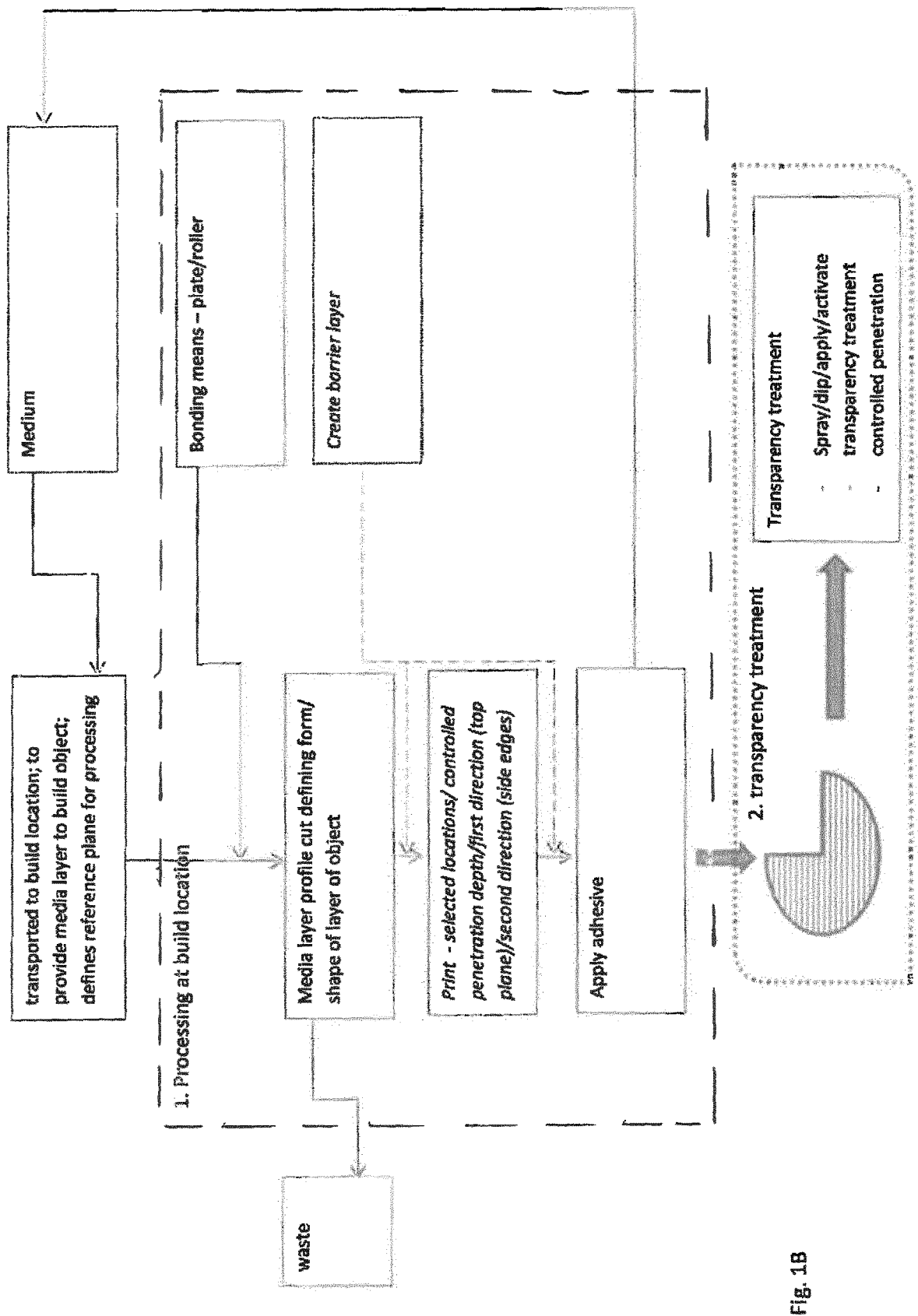
FIG. 1B is a flow chart showing possible steps of methods according to embodiments of the present teaching; the first method relates to the processing of individual layers at a build location to form a 3D object; the second method relates to a transparency treatment to render at least portions of a 3D object transparent, the 3D object being comprised of a plurality of layers of a medium, for example paper.
Figure 2:
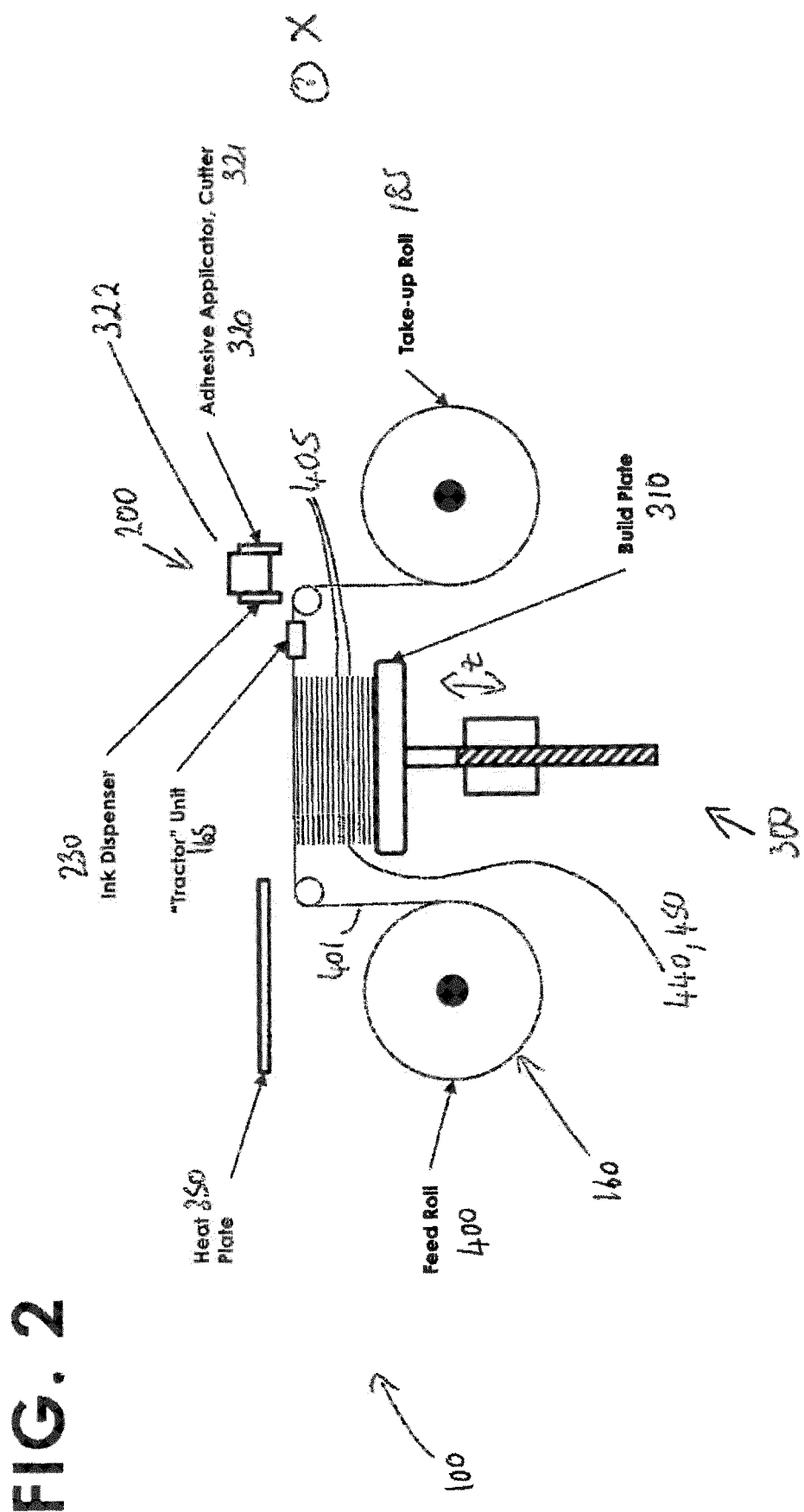
FIG. 2 cross-sectional side view of a 3D desktop printing apparatus according to an embodiment of the present specification including a fixed or movable heat plate.
Figure 3:
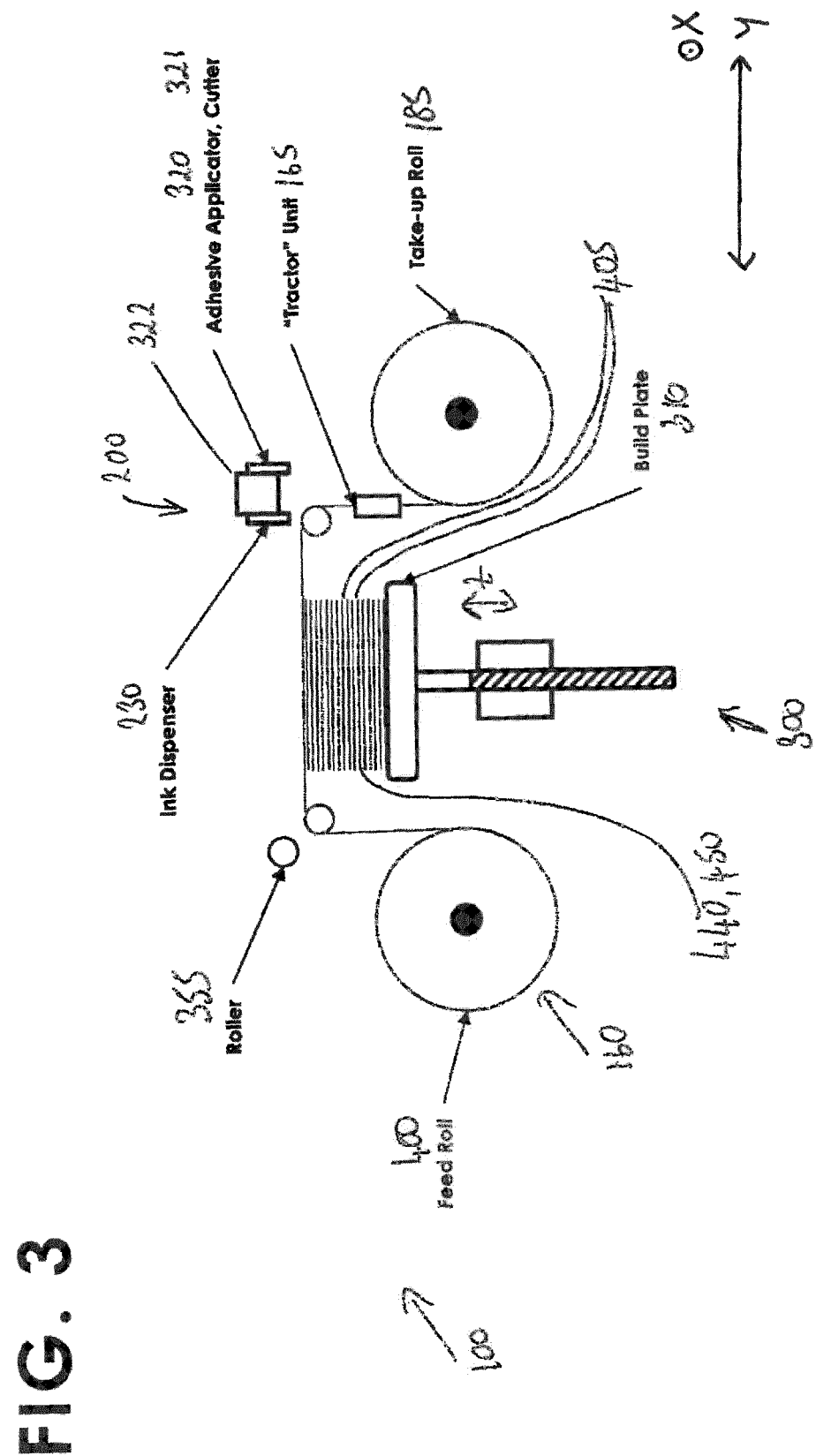
FIG. 3 is a cross-sectional side view of a 3D desktop printing apparatus according to an embodiment of the present specification including a roller.

In the exemplary arrangements of FIGS. 1-3, the processing of a media layer including: cutting, printing and adhesive application are all done in the same reference plane of the object. Each media layer as added or bonded to the build is processed in turn. The last media layer added in the arrangement of the present specification is the upper most media layer. The active components—cutting means, printing means, and adhesive application means are configured to operate in a common reference plane. The active components are configured to operate in a single reference plane. It will be appreciated that the provision of components configured to act in a single or common reference plane provides improved precision and improved processing efficiency and control.

For example, if printing and cutting of a media layer was done separately then there would be a requirement for control of location at each step and also for presentation of the media layer for processing twice—first to the printing means and secondly to the cutting means The transport means 160 of the exemplary arrangement may further comprises one or more feed rollers and/or guides. The transport means 160 may further comprise one or more of a sprocket feed means or nip roller for use with paper configured for sprocket feed or transport. It will be appreciated that suitable alternatives may also be provided to sprocket feed or nip roller. It will be appreciated that different arrangements of rollers and guides may be provided and that additional or alternative guides or rollers may be provided in conjunction with the transport means 160 for transporting to medium of the exemplary arrangement. It will be appreciated that additional drive rollers, pinch rollers, nip rollers or guides may be provided at selected location on the transport path, as required. The medium 401 of roll 400 in the exemplary arrangement comprises paper in continuous roll form configured for feeding via a sprocket feed mechanism. It will be appreciated that various forms of sprocket feed paper may be provided, for example, paper having one or two margins configured for transport by a sprocket feed mechanism of corresponding type. In the case that a sprocket feed roll of paper or similar is used, it will be appreciated that the feed mechanism may be used to provide control of placement and alignment of the medium throughout the transport path 140 from start to finish through the apparatus 100.

Reference is made to the flow diagram FIG. 1b which illustrates an exemplary method of the present specification.

The specification further provides a method of processing a colour 3D object including in an exemplary arrangement the following processing at system 100:

Media layers are processed individually to define a layer of the object.

Media layer 405 transported to build 450 at build location 310

Media Layer is processed to form a layer of the object.

The media layer is processed including:

Profile cut to form layer 405 of the object or media layer N (FIGS. 4 and 5) Cutting the media layer to define an external profile and/or one or more internal profiles of a layer Media Layer 405 (Media Layer N) printed;

Printing the media layer—Ink applied to the media layer 405 (Media Layer N); Ink applied to a defined portion of a media layer.

In practice printing may follow or be define in relation to the profile cutting, which generally define the internal and/or external profiles or those portions which are exposed in the final object.

The method of the specification and system provide control of printing.

The printing may be defined to follow the profile cuts and to include a margin around the profile cuts. Printed may be directed to a first surface of a layer for example the upwardly facing or top plane surface. Further external surfaces of a layer may be printed, for example, the cut edges. The printing may be controlled to vary the final colour appearance of a layer of the object. For example, it is possible to modify the inks. The level of penetration of ink in a layer may be varied. Printing may be controlled apply more ink to a media layer when printing a particular portion. Printing may be controlled to modify the depth or volume of ink at a portion of a media layer. The medium, for example, paper may be modified to vary the penetration of ink into a layer or portion thereof. The medium, for example, paper may be modified to pull the ink into the material, in addition to, or as an alternative to modifying the ink. The medium, for example, paper may be modified to a layer or portions thereof transparent. The ink may be modified as required to provide a desired printing result or as described above for control of levels or penetration of the ink.

Colour of the object is controllable. The colour may be controlled by controlling the locations at which a media layer is printed. The colour may be controlled by controlling the volume or depth of ink applied.

The method further includes:

Bonding a media layer to the build.

Bonding a media layer to a build may comprise bonding the media layer to a base (first media layer) or bonding a media layer to the preceding media layer.

When the layer is bonded to the build, the processing is followed—including the following:

The method according to the present specification advantageously provides for the processing of a media layer in a single reference plane.

The single reference plane refers to the plane of the media layer. Processing to form an object is done on a layer by layer basis. Each media layer is processed in turn to define a layer of the object. The processing of each layer is done entirely at the build location.

The media layer is positioned to the build and then processing including cutting and printing is performed in a common plane. The processes of cutting and printing use a common set of reference points. Effectively, the processes of the media layer including cutting and printing may in an exemplary arrangement have a single reference plane and a single reference point or datum point. This provides for an increase in precision.

This processing including cutting and printing in a common reference plane also provides a reduction in processing load.

The media layer is positioned and located in place at the build. In effect, the media layer is bonded to the build to define a layer of the object. The layer of the object is processed.

The media layer effectively defines a reference plane for the processing of the layer of the object. It has been noted that the media layers may in the exemplary arrangement be comprised of paper, in which case, the media layers are of limited depth according to the type of paper used. In the method of the present specification the uppermost layer is presented for processing. Further the uppermost surface is presented for cutting, printing, application of adhesive and bonding. Referring to the drawing the surface of the media layer is presented in the X-Y plane, the depth of the media layer is defined in the Z direction. Cutting and profiling is across the depth or lateral cross-section of the layer. Printing may comprise applying ink in a first direction—to the plane of the layer. Printing may comprise applying in in a second direction for example to a controlled penetration depth.

In the prior art, the media layers were printed off line. Therefore there were issues relating to alignment of the printed layers and location of each printed layer for cutting and bonding.

The method of the present application provides for processing of a media layer in a single reference plane the processing including cutting the media layer to define the profile of the layer; printing the media layer to define the colour of the layer. The processing may further include the bonding of the media layer to the object.

In the method of the present specification printing the media layer comprises printing one side of the media layer. In the method of the present specification printing the media layer comprises printing the cut side edges of the media layer.

Further printing the media layer comprises applying ink in the same reference plane as cutting the media layer to define the profile. In the method of the present specification the processing of the media layer comprising cutting and printing the media may be done using a set of common reference points or a common reference point.

The processing of the media layer in the exemplary arrangement further comprises applying adhesive to the printed and profiled media layer.

Build 450 or build plate 310 (first media layer) presses to plate 350 or by roller 355 to bond medium 401 to previous media layer 405 or build plate 310 (first media layer) to which adhesive has been applied;

The processing may further include creating a layer or barrier layer 865 on the object or the media layer of the object through which a post-processing liquid or treatment cannot absorb.

Possible method for creating a boundary layer or barrier layer through which a post-processing liquid or treatment cannot absorb include one or more of the following:

The method may further include:
Applying a barrier material 830 to the media layer
The method may further include:
Applying a reflective material 820 to the media layer
The method may further include:
Applying a an epoxy resin 835 to the media layer
The method may further include:
Creating a barrier layer 865 through which treatment cannot absorb has been described in relation to barrier layer, reflective layer and epoxy layer it will be appreciated that other suitable combination or alternative may also be used to create a barrier.

The ink 240, barrier material 830 and/or reflective material 820 and/or epoxy 835 may be applied as required to the media layer.

The method may further include, as an alternative or in addition to creating a barrier layer, applying a transparency treatment which is configured to have a limited or predefined depth or level of penetration into the object. In this case a transparency treatment may be configured to be absorbed only to a predefined depth or depths from external surfaces of the object.

For example if a media layer defines an intermediate layer of an object 450 in which only the cut edges are exposed (in the finished object) the ink may be applied in a band parallel to the peripheral and/or internal edges of the media layer. The ink may also be applied to the cut edges. The barrier layer or reflective layer may be applied as a band parallel to the ink band (see for example, FIG. 5) For example if a media layer defines an external layer or external surface of an object (in the finished object) the ink may be applied across the surface of the media layer. The ink may also be applied to the cut edges. The barrier material or reflective material may be applied to a media layer which in the final product is located adjacent the surface to which the ink was applied for example the lower surface of the next layer (see for example, FIG. 5)

The method further includes:
Applying adhesive to the media layer
The method further includes:
Medium 401 transported to build location 310 and next media layer 405 (media layer (N+1) FIGS. 4 and 5) bonded, profile cut etc.

It is noted that the first media layer N may be provided to a build plate 310 or other base layer to which adhesive has been applied. Subsequent layers N+1, N+2 etc are built successively thereon.

It will be appreciated that the order of the various processing steps may be varied, as required.

The present specification further provides for post processing of the built object 450.

The method may further include:
Applying a transparency treatment
As described, in further detail below, a transparency treatment 850 may be applied to the object to produce a final desired colour effect.

With the transparency treatment 850 selected portions of the object not within the "barrier or boundary layer" 865 are rendered transparent and the selected portions 865' of the object within the barrier layer 865 are not rendered transparent but rather remain white or other colour depending on the colour of the media layer. This has the effect of augmenting the final visual effect of the colour of the object as the printed areas are highlighted against the background of selected portion 860 which are not transparent.

For example, the treatment may be configured to interact with the media layers 405 of the object 450. In an exemplary arrangement a translucent or transparency treatment 850 may be applied to render the paper from an external surface of the object (or surface of a layer) to the barrier layer 865 or reflective layer translucent or transparent to enhance the visual appearance and colour of the object. In practice the surface of the object or surfaces of a layer of the object will be an exposed surface or cut edge. The treatment may be applied to enhance the visual appearance of the applied colour/ink to the user.

The processing may further include creating a layer or barrier layer 865 on the object or the media layer of the object through which a post-processing liquid or treatment cannot absorb.

Possible method for creating a boundary layer or barrier layer through which a post-processing liquid or treatment cannot absorb include one or more of the following:
The method may further include:
Applying a barrier material 830 to the media layer
The method may further include:

Applying a reflective material 820 to the media layer

The method may further include:

Applying a an epoxy resin 835 to the media layer

The method may further include:

Creating a barrier layer 865 through which treatment cannot absorb has been described in relation to barrier layer, reflective layer and epoxy layer it will be appreciated that other suitable combination or alternative may also be used to create a barrier.

The ink 240, barrier material 830 and/or reflective material 820 and/or epoxy 835 may be applied as required to the media layer.

The method may further include, as an alternative or in addition to creating a barrier layer, applying a transparency treatment which is configured to have a limited or predefined depth or level of penetration into the object. In this case a transparency treatment may be configured to be absorbed only to a predefined depth or depths from external surfaces of the object.

Referring to drawings and in particular to FIG. 2 desktop colour 3-D printing apparatus 100 according to an exemplary arrangement of the present specification is described.

Build module 300 comprises a build plate 310 defining the build location. The medium 400 is transported to the build location at the build object 450 or build plate 310 by the medium transport means 160 to provide a media layer 405 of the object, for example, layer N, N+1.

The transport means 160 transports the medium until it is located, as required. A sensor 170 may be provided to indicate to the transport means 160 to stop. In the preferred arrangement of the drawings the transport means 160 includes a tractor unit 165.

The previous media layer for example, N, has had adhesive deposited thereon. The build 450 (or part 450 comprising the media layers 405 at the build plate 310) is pressed into movable or stationary heat plate 350. The build object or part 450 is returned from the heat plate 320.

The cut profile for the layer N is made.

The ink 240 and adhesive 340 are then applied to the layer along with the barrier material 830 and or the reflective material 820. The ink 240 is applied or the layer is printed in accordance with instructions from the relevant print file The build plate 310 is then lowered and the transport means 160 allows the medium 401 to index to the next position. Waste may be transported to a take-up roller 185 or a simple bin to collect material.

The apparatus 100 is configured to provide in a continuous process 2-D printing and 3D printing or manufacture of a 3D build object by SDL by collating, bonding, profiling and printing of the successive media layers N, N+1 etc. The media layers are processed at the build module 300. Each media layer surface is processed as required to define a layer of the object.

Apparatus 100 provides and defines a continuous transport path 140 for the medium to the SDL module 300. Further the system 100 may further include control means 180 for effecting control of the feed or transport means 160. The sensing means 170 may comprise one or more sensors, for example optical sensors configured to detect the position of the media. Data detected by the sensor may be provided or outputted to the control means and used to control transport of the medium.

The print module 200 comprises print head 230. In the exemplary arrangement, the printhead 230 is arranged to print to the upper surface of the uppermost media layer at the build location or build plate. The printhead may be configured to print a portion of the layer. The printhead 230 may be configured to print other surfaces of the layer for example, a cut edge. The printhead 230 may be an inkjet printhead.

The collation or build module 300 provides for the building of the 3D object by SDL. The build module 300 comprises a build plate 310, adhesive dispensing means 320, cutting means 321. The build module 300 may further include a heated plate 350 or other collating or bonding means for example, a roller 355. As noted above the build module also comprises printing module 200 and print head 230. The object is processed, printed and built entirely within build chamber of module 300. Each media layer is processed, as required, to define a layer of the object at the build chamber.

The upper most media layer is processed. The processing at the build location includes a surface processing.

The media layer is cut to the profile of the layer it is to define of the object, the media layer is printed, bonded and otherwise surface treated as required.

The ink application means 230 may be controllable to provide control of printing including depth of printing to the media layer at selected locations. The volume or properties of ink applied at specified locations of the media layer, in the exemplary arrangement, having the thickness of a sheet of paper, may be varied to vary the penetrate the depth or thickness of the media layer at some locations to penetrate a portion of the depth or thickness of the media layer.

As noted above in the method using SDL—the data in files is read and the computer model is sliced into printable layers equivalent in thickness to the media layer. The system provides for the printing on a layer by layer basis. The system controls printing to provide the required penetration of ink across the depth or thickness of the media layer. As described the method also provides for transparency treatment to render selected portions of a media layer for example adjacent to the printing transparent, as required.

While with previous arrangement, full media layer penetration was often needed to provide a full colour finish—the method of the present specification which uses the application of ink (colour) in combination with the transparency treatment provides greater flexibility, control options and precision.

In a preferred exemplary arrangement, the adhesive dispensing means 320 and cutting means 321 may be mounted to a multifunctional head 322. The adhesive dispensing means and cutting means are mounted and operate in an area above the build plate 310. The printhead 230 may be similarly mounted and operate in the area above the build plate 310. The adhesive dispensing means and cutting means may be, for example, mounted on an X-Y frame for movement over the build plate 310, as required. The print head may be similarly mounted on an X-Y frame. The printhead 230 may be mounted to multifunctional head 322 together with the cutting and adhesive dispensing heads It will be appreciated that suitable alternative arrangements which allow for the adhesive dispensing means, cutting means and printhead to operate above the build plate may also be used. While it has been described that the printhead, cutting/profiling head and adhesive dispensing head are arranged to move about and operate in a space about the build plate, alternatives may be provided without departing from the invention, for example, the build plate may be configured to move relative to the various heads.

The build plate 310 may be moveable between a first raised and second lowered position within the system. As noted above, the build plate 310 and build 440 (or object being formed) may be raised to the heat plate 350 as each media layer 405 is transported to the build 450 to press the new media layer to the build. The build plate 350 is lowered as the successive layers of media (N, N+1, N+2 . . . etc) are added to the build plate 310 to build the object.

Cutting means 321 and adhesive dispensing means 321 are configured to provide cutting, of the object form and application of adhesive to the medium 400 forming media layer 405 of the object. Cutting means 321 is configured to cut out an outline section of the medium 401 to define a media layer 405. The cutting means 321 may also be configured to make a series of cross-hatch cuts in portions of a media layer 405 which does not form part of the final object 450 i.e. portions of a layer to be weeded. The first media layer N may be provided to a build plate 310 or other base layer to which adhesive has been applied. Subsequent layers N+1, N+2 etc are built successively thereon.

The transport means 160 provides for the transporting of the medium 401 through the apparatus 100, for transferring a media layer, as required, from the roll to the build module 300 and for cutting, application of adhesive, and printing.

Referring to FIG. 3, a further exemplary apparatus 100 according to the present specification is illustrated. The apparatus 100 of FIG. 3 is similar to that of FIG. 2 and the same reference numbers have been applied where appropriate. Details of the various similar components have not been repeated. In the exemplary arrangement of FIG. 3, a roller 355 may be provided instead of a fixed or movable heat plate 350 for bonding of successive media layers. In such arrangement when a new layer N+1 is transported into position over the part 440, it is bonded to the upper surface of the previous layer (N), of the part 440 to which adhesive has been applied, by moving the roller 355 over the surface of the new layer N+1

Referring to FIG. 4, an illustration of an enlarged view of a number of media layers of an object is shown. A layer n has depth Z1 and width in the cross-sectional view shown Yn. Layer n+2, for example, has depth z1 and width in the cross-sectional view shown Yn+2. The media layers of the illustration have been profiled and cut edges 410A are illustrated.

The printing on a selection of media layers with CMYK "subtractive" colours is illustrated. CMYK "subtractive" colours are so named because they work by subtracting the white light from the paper. Without the white point of the paper, the colours will look different.

Accordingly, the present specification further provides for the further processing of the object 450 or part after building to render selected or defined media layers or portions of those media layers transparent to provide an improved visual appearance and colour to the final product.

For example, selected portions of media layers may be rendered transparent by a transparency treatment material 850. The transparency treatment material 850 may be applied in a post processing step for example, by dipping the object 450 or spraying the surface of the object 450. The transparency treatment 850 may be absorbed into the layers of the model and may continue to be absorbed into the model due to the absorbency of paper.

If by application of the transparency treatment 850, the model or object or part 450 were to become totally transparent, the white point would be reduced.

Referring to FIG. 5, the method of the present specification further provides for application of a layer of reflective material 820 or a barrier material 830 which may be deposited on boundary layers to prevent the transparency treatment 850 entering deeper into a layer 405 (N) than required in the Z direction or in the X direction. The deposition of a reflective layer 820 or barrier layer 830 may be effectively controlled to control the level or depth to which the transparency treatment 850 is absorbed into the model. This control of transparency treatment 850 depth is used to maintain the white point of the finished build model 450 and provide CMYK colours, as required.

In one arrangement the transparency treatment 850 may comprise a polymer material and/or a colloidal material and/or a colloidal suspension of an acrylic polymer in water.

The reflective material 820 or barrier material 830 may be applied selectively for example, to define a boundary or barrier layer 865 of a media layer 405 of an object 450.

The reflective material 820 or barrier material 830 may be applied, for example, at the same time as the ink 240 or adhesive 340. Alternatively the reflective material 820 or barrier material 830 may be applied separately. The reflective material 820 or barrier material 830 may be applied to selected portions only of selected of the media layers 405. The reflective material 820 or barrier material 830 may be applied for example over the area of a surface of a media layer which is opposite to the surface which is printed. The reflective material 820 or barrier material 830 may alternatively be applied to the surface of the media which is to be or has been printed, for example in a band spaced apart from and parallel to a profile cut or cut edges 410 of a media layer 405.

For example, referring to FIG. 5, if a media layer N+1 defines an intermediate layer of an object 450 and is located in the middle of an object and only an edge portion of that layer N+1 is visible in the build object, then in one exemplary arrangement ink 240 may be applied in a band of depth $Z_{ink1}$ and width $Y_{ink1}$ around the profile cut and to the edge 410A and further a barrier material 830 or reflective material 820 may be applied in a band of width $Y_{barrier1}$ and depth $Z_{barrier1}$ adjacent the band of ink 240 and spaced apart a constant distance $Y_{ink1}$ from the profile cut of that layer N+1.

Referring to FIGS. 5A, 5B, 5C and 5D exemplary arrangements for application of the barrier layer/reflective layer are illustrated.

Figure 5A:
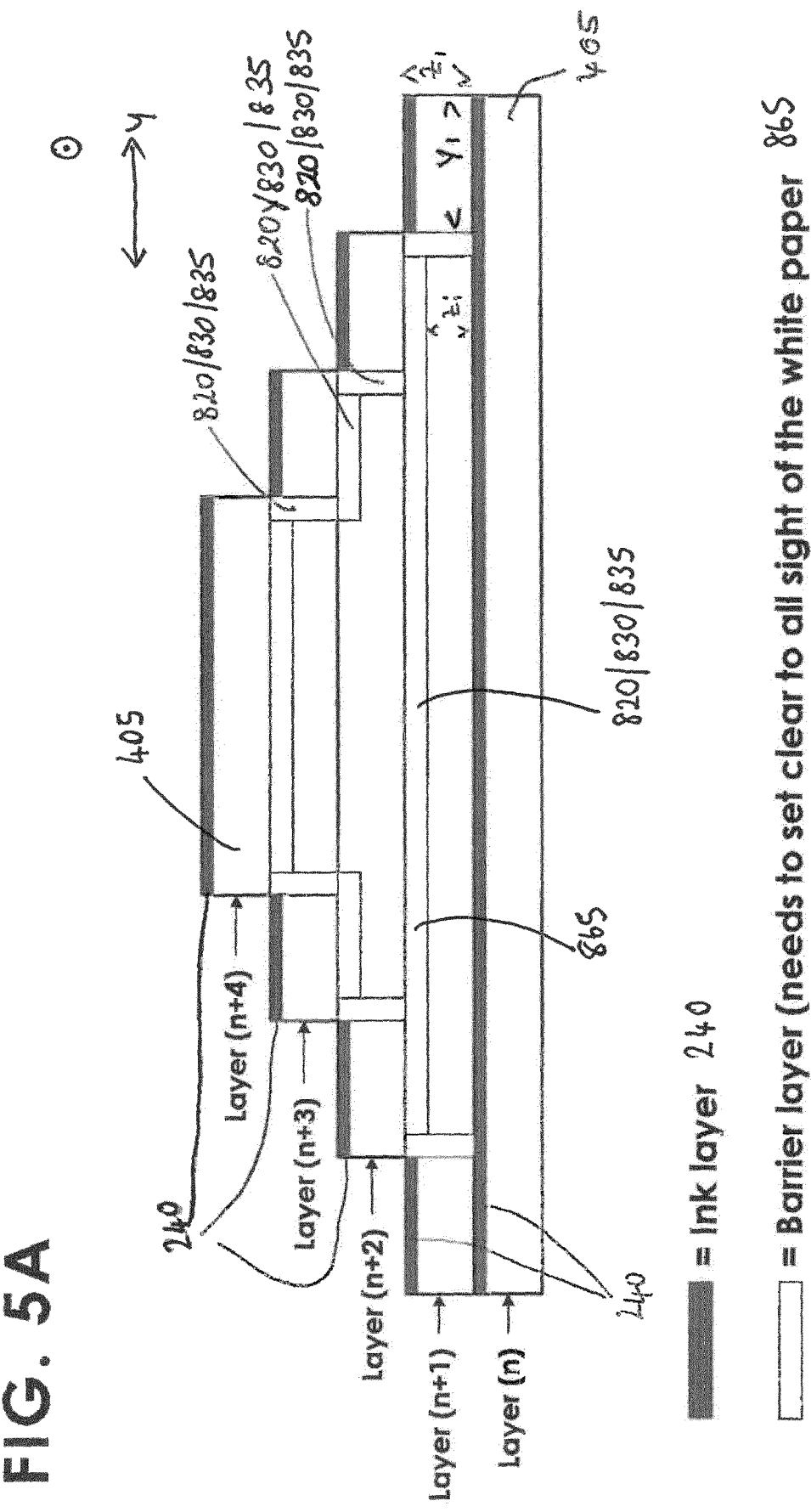

As illustrated in exemplary FIGS. 5A and 5B the barrier layer may be applied adjacent the printed areas. After the transparency post-treatment the result of post treatment of the object to which ink and the barrier/reflective layer has been applied is illustrated. In effect as shown the method is controlled to provide the barrier/reflective layer 865 such that it creates a "boundary zone" 865' to prevent the transparency solution 850 penetrating all the way through. Portions 870 of the object are rendered transparent as transparency treatment 850 is absorbed.

Referring to FIGS. 5C and 5D in an alternative exemplary method according to the present specification, the barrier/reflective layer may be applied to the ink layer, as required or selected in the method.

Effectively, a boundary zone 865' is created encapsulating the white paper and preventing it from becoming transparent.

The method further provides that a surfactant 840 may be applied to one or more media layers 405. In one arrangement, the surfactant 840 may be included with an ink 240 or adhesive 340. In another arrangement, the surfactant 840 may be applied directly to a media layer for example by spraying directly to a surface of the medium 401. In a further case, the medium 401, for example, paper may be pre-treated with a surfactant 840.

By controlling the application and location of the various elements—ink 240, and reflective material 820 or barrier material 830, and surfactant 840 and further by controlling the transparency treatment 850 of the media layers 405 of an object 450 it is possible to control, the final visual appearance and colour appearance of an object 450, as required While in the exemplary arrangement of FIG. 5, the barrier or reflective materials 830/820 have been described and shown as applied separately from the ink, it will be appreciated that in an alternative arrangement, the ink may incorporate a barrier or reflective material.

It will be appreciated that the transparency treatment 850 may refer to a processing of the object after the object 450 is formed.

It will be appreciated that the transparency treatment may be applied to layered objects form by different means—for example using the systems as described in other patent applications by the same applicant.

The final colour of an object is defined by the judicious processing of individual layers of an object. Ink and/or barrier and/or reflective materials may be applied to portions of the individual layers. After the object is manufactured the object may be post treated to provide the final colour.

In effect, it can be considered that ink 240 may be applied in a first direction relative to a media layer. For example application of ink in a first direction may effectively comprise ink being sprayed onto the plane of the upper surface of a media layer. Ink may further be applied in second direction relative to a media layer, i.e. to the cut edge 410, which ink is applied across the lateral cross-section of the media layer at the profile cut. Further as noted, the volume of ink applied at any portion of a media layer may be controlled such that ink applied at a portion of a media layer may be applied to a surface or to penetrate the depth of the layer at a particular location.

Similarly, as noted about the barrier material 820 or reflective material 830 may be applied to define a boundary layer BL 865. The boundary layer 865 may be a band defining a lateral cross-sectional portion of a media layer, for example if a layer defines an intermediate layer. A boundary layer could also be a layer parallel with the major plane or surface of a media layer, for example, if a layer defines an external layer of an object. Any media layer of an object may include external and internal profile cuts, the reflective 820 or barrier 830 materials may also be applied for example in a band at a constant separation or depth from the external or internal profile cuts.

The streamlined single-sided printing process involves an additional post-processing step to make the paper translucent and obtain full-colour 3D models. The opacity of paper is due excessive light scattering, arising from a refractive index mismatch between its primary components. The Pores and cavities of dry paper are filled with air, which has a refractive index of 1. The pore walls are made of cellulose, which is itself transparent but has a refractive index of approximately 1.55. This mismatch results in an increase of scattering events as the paths of separate photons become chaotic. When refractive Index matching liquids are used, the medium of the pore is replaced with a liquid which has a closer refractive index to cellulose than air. This reduces trajectories of the photons and, in turn, the scattering properties of the paper.

In an exemplary arrangement the transparency treatment material 850—may comprise refractive index-matching materials which may include triglyceride-based oils, such as drying, cooking, nut, citrus, medicinal oils. Synthetic polymer-based materials such as acrylics and polyurethanes may also be used as a transparicising agent. Such materials are advantageously relatively low-cost, eco-friendly, safe to use and have a refractive index as close as possible to that of cellulose (1.55 at 592 nm).

In a further exemplary arrangement, a method of treating to a 3D object to render selected portions of a layer or layers of the object at least partially transparent, the 3D object comprising a plurality of media layers of paper material and the method comprising: applying a transparency treatment material to the at least selected portions of the object, the transparency treatment material configured to penetrate through a predefined depth of a media layer or media layers wherein as the transparency treatment material is absorbed into the media layer the media layer is rendered transparent.

Options for the transparency treatment material include the following:

The transparency treatment material comprises high molecular weight materials which will preferably having a refractive index as close as possible to that of cellulose (1.55 at 592 nm).

The transparency treatment material may comprise synthetic polymer-based materials such as acrylics, polyurethanes and epoxy resins. In the case of epoxies, a separate hardener/cross-linker material may be required.

The method may further comprise controlling the depth of penetration to which the transparency treatment material is absorbed into the object. The depth of penetration may be controlled to maintain the white point of the finished build model object and provide CMYK colours, as required.

Control of the penetration depth may be achieved by a fast-cure solution, such as UV curing. This curing method does not involve ambient solvent evaporation, and materials can dry under a UV lamp in significantly less time than it takes for solvent-based resins & adhesives. In addition to fast curing times, UV-based resins do not contain VOC's (volatile organic solvents), which results in a much more facile processing solution.

The method may further comprise creating a barrier or boundary layer to limit penetration of the transparency treatment material. The method may further comprise creating a boundary layer comprises applying a reflective material or barrier material. The reflective or barrier material may be applied to each layer.

"Referring to FIG. 4, an illustration of an enlarged view of a number of media layers of an object is shown. A layer n has depth Z1 and width in the cross-sectional view shown Yn. Layer n+2, for example, has depth z1 and width in the cross-sectional view shown Yn+2. The media layers of the illustration have been profiled and cut edges 410A are illustrated.

The printing on a selection of media layers with CMYK "subtractive" colours is illustrated. CMYK "subtractive" colours are so named because they work by subtracting the white light from the paper. The white point of the paper is integral to maintaining the model's colour gamut. If the transparicising agent penetrates through too many layers, there would be an insufficient white colour base to reflect/scatter light back towards the user, which would reduce colour intensity and result in inferior 3D models. Due to this, the post processing material must be designed to only make the topmost layers of the model transparent. Ideally, the difference between the colour on the printed top-layer, and the non-printed under-layer should be kept to a minimum. The system used to calculate the colour difference is the Internationale de l'Eclairage (CIE) L*a*b* colour system, which is an international standard that expresses colours as numerical values. The change in colour, or ΔE value, should be low enough so that the colour change between the layers is imperceptible to the naked eye. This point is generally accepted to be a ΔE value of 4 or less for most people.

Accordingly, the present specification further provides for the further processing of the object 450 or part after building to render selected or defined media layers or portions of those media layers transparent to provide an improved visual appearance and colour to the final product.

For example, selected portions of media layers may be rendered transparent by a transparency treatment material 850. The transparency treatment material 850 may be applied in a post processing step for example, by dipping the object 450 or spraying the surface of the object 450. The transparency treatment 850 may be absorbed into the layers of the model and may continue to be absorbed into the model due to the absorbency of paper.

The system and method as described include arrangements including creating a barrier layer 865 on the object through which the post-processing transparency treatment or liquid 850 cannot absorb, or configuring the transparency treatment or liquid 850 materials so that it dries/hardens too quickly to penetrate through a predefined depth of a media layer or media layers. The former barrier system could be achieved by treating the paper surface and pore volume with a material for example the reflective, barrier or epoxy materials 820, 830 or 835 or other suitable materials to provide the same results i.e. to repel the post processing liquid or transparency treatment 850.

The materials described on application alter the hydrophobicity of one of the phases in order to repel the other.

The latter system is achievable in an exemplary arrangement via application of a material such as an epoxy resin 835. These polymers are fast-drying, non-toxic and have a sufficiently high enough viscosity such that they already begin to form a solid film before they can penetrate through a significant number of layers. Another advantage of these materials is that their drying/cross-linking times can be vastly increased by reacting them with another cross-linking agent (usually and amine reagent). Initial results with such cross-linked systems have resulted in ΔE values of 3.5, which is well within the target range.

If by application of the transparency treatment 850, the model or object or part 450 were to become totally transparent, the white point would be reduced.

It will be appreciated that if required the method provides for manufacture of a transparent object. Applications may include production of an object for example a transparent object for particular applications.

It will be appreciated that a layered object manufactured using a different system could also be post treated using the transparency post treatment to render portions of the object transparent.

In the specification, the processing or treatment of the 3D object comprises application of a treatment material to the object. This is referred to as the transparency treatment liquid or formulation or material or emulsion 850 in the specification. The transparency treatment emulsion is a material applied to the object or portions thereof to render it transparent. The transparency treatment may be applied to the object when built. The transparency treatment may be applied to portions of the object. The transparency treatment emulsion or material 850 may be applied to individual layers of an object or portions thereof. The application to layers or portions thereof may be controlled for example in conjunction with the application of a barrier material or epoxy. As noted above, the penetration of the transparency treatment material in an object may also be controlled by control of the formulation of the treatment.

As noted, the media layers of the object are of a porous material. The transparency treatment material 850 is configured as an infiltrant material. The porous material of the media layers may be configured in an exemplary arrangement to act as a scaffold for the transparency treatment material 850 enabling it to absorb the infiltrant material.

The Specification Includes Treatment Methods for Making Paper Transparent and/or Partially Transparent Essentially in the approach of the method of the specification methods are provided for making paper transparent and or partially transparent. The methods primarily apply to single sided printing which refer here to the process of printing a coloured image on one side of paper then making it visible on the opposite side.

In further arrangements, there are provided further methods which include use of wetting liquids (also herein referred to as base coat), polymer-based emulsions and polymer liquids (also herein referred to here as top-coat/treatment formulation/transparency treatment formulation) for treating paper or 3D forms made from a stack of paper laminate such that areas where treatment is applied become transparent or partially transparent.

The base coat may be any colourless liquid or made colourless by some means with favourable surface tension for wetting paper. The preferred class of base coats includes reactive and non-reactive silicone oils family and Liquid silicone rubber (LSR) family (both one and two component systems). Any suitable mixture combination of these may be used.

The Top-coat may be any material having the favourable optical properties which include transparency and refractive index close to that of cellulose fibre. Suitable polymer systems for the top coat include, but are not limited to, liquid silicone rubbers and resins systems, acrylics, polyurethanes and epoxies systems either in their pure liquid form or as an emulsion. It will be appreciated that any suitable mixture combination of these polymer systems may be use well.

The specification also provides a further method including use of a formulation or emulsion of a polymer system dispersed in a wetting liquid for treating paper or 3D forms made from stack of paper laminate such that areas where treatment is applied become transparent or partially transparent.

The formulation or emulsion as described previously may including any wetting liquid and polymer systems (as noted above) or any suitable mixture combination of these.

Paper is a porous medium composed of a network of cellulose fibre matrix treated with auxiliary coating(s) to impart user selected functions including mechanical and optical properties. In general the mechanical properties are primarily controlled by the cellulose fibre network while the auxiliary coating provide the optical/aesthetic attributes. In particular light refraction/scattering within the paper medium is influenced/controlled by the auxiliary coating and the morphology of the paper medium (e.g. porosity). The quality of a coloured image printed on paper is influenced by the light refraction/scattering of this latter.

This specification includes methods for controlling/manipulating the light refraction/scattering of the paper medium. The methods are used to control the colour quality of coloured images printed on paper. The methods primarily apply to single sided printing which refer here to the process of printing a coloured image on one side of paper then making it visible on the opposite side.

The methods of the specification include those based on controlling the transparency of paper to alter the colour quality of coloured images printed on paper. Specifically it is demonstrated that paper can be made transparent or partially transparent such that a coloured image printed on one of its sides is equality visible on the opposite side. Similarly the colour quality of the cross-section of a pre-printed paper stack laminate is made visible by the same methods.

The methods include the impregnation of paper or paper stack laminate with liquid materials that alter/control its light refraction/scattering properties. The paper stack laminate may be formed using any 3D object fabrication process such as Selective Deposition Lamination (SDL) and other appropriate Layered Object Manufacturing (LOM) techniques etc.

Impregnation maybe be achieved using any liquid application method examples being spraying, dipping, dip coating, brushing, dispensing or a combination of any of these methods. The impregnation maybe achieved in one or multiple application (s) of the impregnating material (s).

In one arrangement of the specification (exemplary method A) paper is first impregnated with a wetting liquid medium (referred to here as a base coat). A second coat (referred to here as top-coat/transparency treatment formulation) made from an emulsion of a polymer dispersed in the wetting liquid is then applied. This alternating impregnation process is repeated until the desired colour quality is achieved. While the emulsion includes the wetting liquid as the dispersing medium, it can be easily understood that emulsions made using other dispersing media may be used. One may further use transparent/clear liquid polymeric resins as the top-coat.

Example

An exemplary arrangement of FIG. 1 is for example a single side printed 3D object impregnated for example using simple brushing or other suitable method. The base coat used is a silicone oil and the top coat (treatment formulation/transparency treatment formulation) is an emulsion of water base adhesive ethylene vinyl acetate (EVA) glue dispersed in a co-mixture of silicone oil/propylene glycol as the carrier vehicle.

In a further exemplary method, exemplary method B, the base coat step may be omitted and the impregnation is carried using directly an emulsion of transparent polymer dispersed in the wetting liquid. The impregnation process is repeated until the desired colour quality is achieved. Any of the above described methods can be used singly or in combination with exemplary method A being the preferred method as the base coat wetting liquid provide further support for the top coat (treatment formulation/transparency treatment formulation) to penetrate the paper network.

There the specification provides for the base coat and top coat to be provided in a combined treatment formulation or for both to be provided separately.

Impregnating Materials
Base Coat Materials: Paper Wetting Material

Any colourless liquid or made colourless by some means with favourable surface tension for wetting paper can be used. This liquid should remain temporary in the paper's top surface fibre network the time the top coat is applied and then eventually absorbed away into the paper bulk medium. In addition this liquid should be colour-fast. The preferred class of paper wetting liquids in this demonstration include the reactive and non-reactive silicone oils family and Liquid silicone rubber (LSR) family (both one and two component systems). Alternatively non-ionic surfactants (liquid or solid (dissolved in a carrier vehicle)) may be used as the primary purpose of the base coat is to wet the paper and promote the absorption/adsorption of the top coat into the paper's top surface layers.

Top Coat Materials: Paper Transparency Material

The role of the top coat material is to absorb in the top layers of the paper and fill up the paper's porous network. In addition this material must have favourable optical properties which include transparency and refractive index close to that of cellulose fibre. Suitable polymer systems for the top coat include (but not limited) silicone rubbers, silicone resins, acrylics and polyurethanes either in their pure liquid form or as an emulsion. This demonstration used an emulsion of acrylic polymer dispersed in a base coat liquid vehicle. However it can be easily understood that a polymer system in pure liquid form may be also used. Further a combination of pure and emulsion based systems maybe used in alternating coats.

Figure 6:
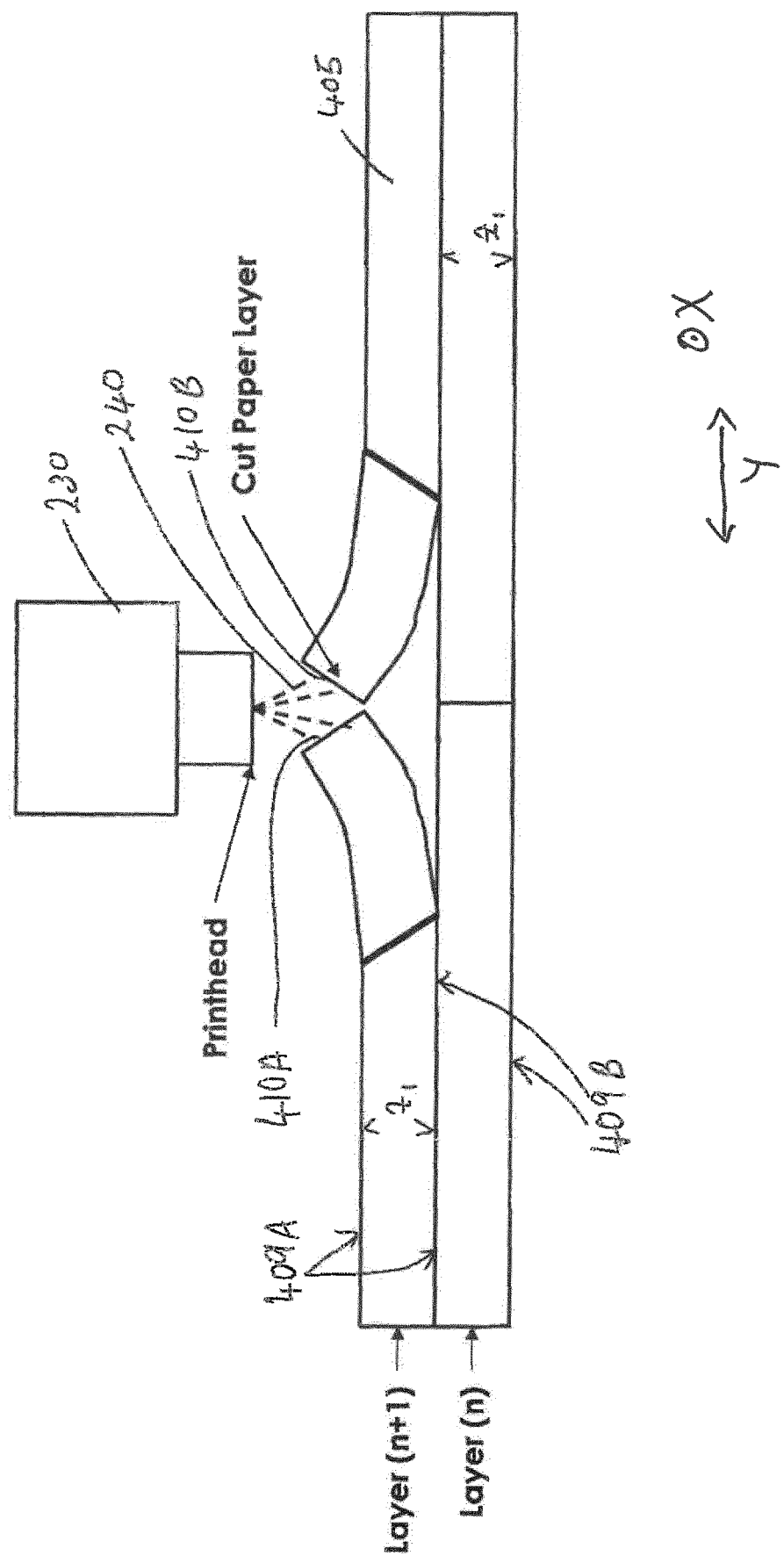
FIG. 6 is an illustration showing an enlarged cross-sectional side view of cut media layers, illustrating the printing of the edges and in particular across the lateral cross-section of media layer edges.

Referring to FIG. 6, it is illustrated that in an exemplary arrangement, as the media layer N+1 etc is cut, a burr is produced following the shearing action of the blade.

This burr tends to raise the cut edges 410A of the object, 410B (of the medium 401) upwards. This upward movement of the cut edges 410A, 410B enables the jetting of ink to reach the cut surfaces 410A of the media layers. When the next sheet is laid down (Layer (n+2) not shown) and pressed/rolled, this flattens the burr before the cut takes place on layer N+2.

The jetting of ink to the cut surface 410A provides an improved colour effect on the surface of the object 450.

Printing after the profile cut has been made advantageously allows the ink to penetrate into the cut.

Figure 7:
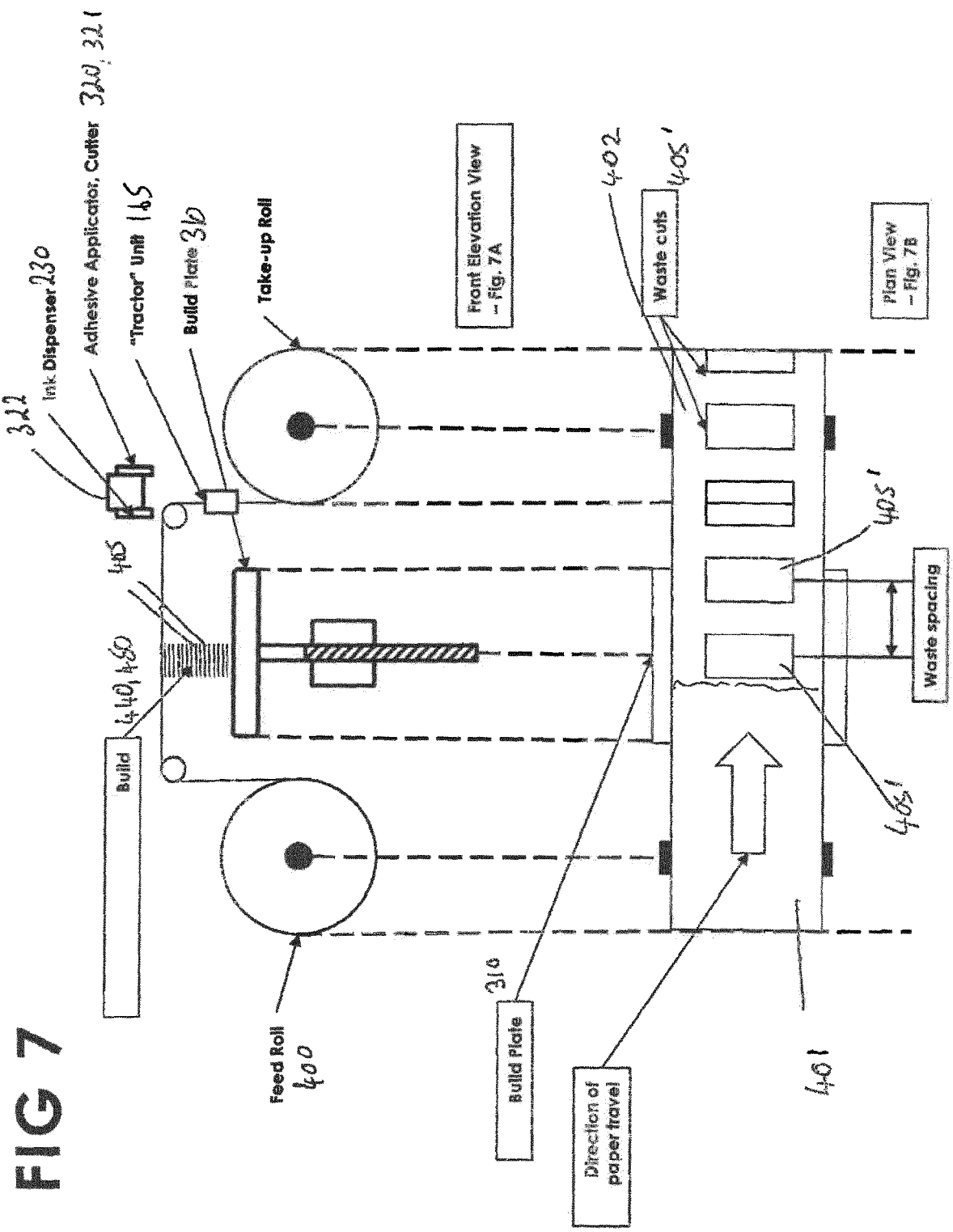
FIG. 7 shows views of the printing apparatus and in particular illustrates the arrangement for operation to provide an adaptive build.

Reference is made to FIG. 7 which illustrates and exemplary arrangement according to the present specification. It is noted that system 100 may further provide for an adaptive build of an object 450. The successive media layers 405 are effectively cut from the medium 401 in roll form 400 according to the external cut profile of the particular media layer 405 to define a layer of the object. Each cut 405 also define a cut-out 405'. The size of the media layer 405 will vary from one media layer to the next depending on the profile of the object. Only a media layer of the size required or size required+margin needs to be cut from the medium. The system 100 and method of the present specification accordingly provide a reduction in the processing requirements, for example, relating to weeding of portions of a build object relatively outside to the external profile of the layer of the object and a reduction in waste of material. The medium from which media layers have been cut define a waste material 402 which is transported from the build location.

The adaptive build arrangement of the system according to the present specification provides advantages including the following—increased speed, reduced waste, provides for application of ink to the cut edges directly—improvements in relation to the colour of the object.

Referring to the exemplary arrangement of FIG. 7 according to the present specification, the adaptive build aspects of an exemplary system according to the present specification are described in further detail.

The arrangement of the present specification advantageously including providing:

All sheet layer profiling operations (i.e. adhesive application, colour printing, profile cutting, sheet lamination and waste sheet removal) are carried out in one common reference plane.

Selective adhesive deposition between the 3D object area and waste area

Final sheet lamination is carried out before waste sheet removal

Use transparency treatment materials to render visible the colour of sheet or 3D objects Use of epoxies or other appropriate materials for creating a penetration depth barrier layer for sheet transparency materials. Both the barrier layer and sheet transparency treatment materials may be UV, moisture and/or heat curing Use of epoxies or other appropriate materials for sheet transparency treatment materials. These sheet transparency treatment materials may be UV, moisture and/or heat curing Use of epoxies or other appropriate materials for creating a penetration depth barrier layer for sheet transparency treatment materials. Both the barrier layer and sheet transparency treatment materials may be UV, moisture and/or heat curing Use of epoxies or other appropriate materials for sheet transparency treatment materials. These sheet transparency treatment materials may be UV, moisture and/or heat curing The Arrangements of the Specification Include Use of Photo-Setting Materials for Creating Barrier Layers and or for Carrying Out Sheet, 3D Object Transparency Treatment.

The arrangement of the system of the present specification which supports adaptive building provides advantages as follows:

When using sheets of paper, the entire sheet needs to be processed, no matter how small the part was. Therefore if making a small 20 mm wide part, the entire A4 page would have to be used. The disadvantage of processing the entire sheet include:

Increased waste

Reduced speed

More difficult weeding (the whole block needs to be weeded until you reach the small part inside However, when using a roll of paper, we can use an adaptive build which means that we only process the waste around the part (or even just the part itself) and not the entire sheet. This has a number of advantages:

Reduced waste material (in some geometric cases it can remove all the waste material Increased build speed (as only the adaptive part needs cutting, glue and adhesive)

Easier weeding of waste material as there is a lot less to remove (and in some cases nothing to remove)

The size of the waste cuts can also vary as the build progresses through the build reflecting the changing geometry being made The method includes the following:

Medium in roll form transported in direction Y1 to build chamber/build plate

External profile of a media layer 405 defining a layer of the object being built is cut from the medium in roll form leaving a cut-out-405'

The medium transported forwards, the media layer 405 remains at the build and waste is removed While the system of the exemplary arrangements of the drawings described uses as input individual media layers drawn from a roll input, it will be appreciated that in a suitable alternative arrangement the layers may be provided in sheet form, or other suitable form.

The media layer is processed including bonding, printing, profiling, transparency treatment, as required.

The arrangement of the present specification advantageously provides improved processing for building a 3D object. The arrangement of the present specification further provides for improved control of the printing and improved control of colour of the object.

When upper and lower surface of an object are separately printed issues often arise relating to alignment between images on the first side and second sides of a media layer for 3D printing. The arrangement of the present specification provides an improved desktop 3D printing apparatus. The apparatus is advantageously configured to provide 2-D printing and 3-D printing of a medium in an integrated process. As described herein, the media to be printed, paper, in the exemplary arrangements of the present specification is provided to the apparatus in sheet or roll format, paper is transported to the build plate for the SDL process for printing, profiling and bonding.

The arrangement of the present specification may advantageously be used but not limited to for example for 3D printing of photographs or contour maps. The object manufactured by 3D printing has precision colour to specification throughout the layers of the object. The approach provided is high precision and the 3D objects are of improved quality.

Therefore the system of the present patent specification provides improved colour results in 3D printing.

The specification also provides 3D objects produced in accordance with the methods and system described.

A 3D object produced by operation of the system in accordance with the methods described comprises a layered object of a plurality of layers of a medium bonded by adhesive. Each layer is cut to define the profile of a layer of the object. Each layer may be printed to define the colour of a layer of the object. The layers are in an exemplary arrangement of paper. The adhesive may be a water based adhesive. The object advantageously is produced to high precision standards. Each layer is processed in a common reference plane. The layers are thereof aligned and assembled with high precision. Portions of layers of the object are printed on one side of the layer surface. The cut edges may also be printed. Portions of layers of the object may comprise a barrier or reflective material or an epoxy resin defining a barrier layer. Portions of the layers of the object may be transparent. Portions of layers of the object may be rendered transparent by application of a transparency material. A 3D object having printed and transparent portions will have an overall colour finish. The transparent portions being located in proximity to printed portions to work together with the printed portions to provide a finished colour appearance. The transparent portions and printed portions providing in the finished object a colour appearance, as required.

The methods of the specification also provide a transparent object. The object comprises a plurality of media layers medium bonded by adhesive. Each layer is cut to define the profile of a layer of the object. Each layer may be printed to define the colour of a layer of the object. The layers are in an exemplary arrangement of paper. The adhesive may be a water based adhesive. The layers may be treated by a transparency treatment material to render the object transparent.

In the art problems arise may including the lag in the offset printing process when doing a one off print job as it is necessary to wait until the sheets for the print job are pre-printed.

The arrangement of the present specification advantageously provides

Printing after the white sheet is stuck onto the build
This removes the pre-printing stage
This removes the requirement for high precision placement when working with pre-printed images.

This removes the need for high precision duplex 2D printing stage

Printing after the cut has been made (this allows the ink to penetrate into the cut)

To enable the ink to be seen on the underside the following options are provided Make the paper translucent by adding a coating in the post processing stage.

Optionally controlling the penetration of the coating by adding a barrier coating during the build Optionally adding more ink to the sheet Optionally modifying the sheet to pull the ink into the material rather than modifying the ink It is possible to operate the apparatus of the present specification with paper of various thickness, including paper thinner than might be considered suitable for use with other systems.

The arrangement of the present specification provides an efficient process.

The words comprises/comprising when used in this specification are to specify the presence of stated features, integers, steps or components but does not preclude the presence or addition of one or more other features, integers, steps, components or groups thereof.

The invention claimed is:

1. A method of forming a colour 3D object comprising a plurality of media layers wherein each media layer is processed to define a layer of the object, the processing of each media layer to define a layer of the object including:

bonding the media layer to a preceding media layer or base layer of the object, cutting a profile of the media layer, and applying adhesive to the media layer, repeating the processing for each successive media layer until the object is formed, and the method further including applying a transparency treatment material to selected portions of a layer or layers of the object to render the selected portions transparent, and further comprising creating a barrier or boundary layer at selected portions or locations of at least one of the plurality of media layers or on the object to limit penetration of the transparency treatment material.

2. The method of claim 1, the transparency treatment material comprising a refractive index-matching material.

3. The method of claim 1, the transparency treatment material comprising triglyceride-based oils.

4. The method of claim 1, the transparency treatment material comprising synthetic polymer-based materials.

5. The method of claim 1, the transparency treatment material having a refractive index of 1.55 at 592 nm.

6. The method of claim 1, the transparency treatment material comprising a polymer system including one or more of liquid silicone rubbers and resins, acrylics, polyurethanes and epoxies, either in their pure liquid form or as an emulsion.

7. The method of claim 1, the transparency treatment material comprising an emulsion of a polymer system dispersed in a wetting liquid.

8. The method of claim 1 further comprising controlling depth of penetration to which the transparency treatment material is absorbed into the object.

9. The method of claim 8 wherein the depth of penetration is controlled by using fast-cure solution.

10. The method of claim 9 further comprising curing of the transparency treatment material, wherein the step of curing does not include ambient solvent evaporation and wherein the transparency treatment material is dried under a UV lamp in less time than required for solvent-based resins and adhesives.

11. The method of claim 9 wherein the fast cure solution is a UV-based resin that does not contain VOCs (volatile organic solvents).

12. The method of claim 1, the transparency treatment material comprising synthetic polymer-based materials.

13. The method of claim 1 wherein the transparency treatment material comprises an epoxy resin and a separate hardener/cross-linker material is provided.

14. The method of claim 1 wherein creating the boundary layer comprises applying a reflective material or barrier material.

15. The method of claim 14 wherein the reflective or barrier material is applied to each media layer.

16. The method of claim 1 wherein the barrier layer comprises an epoxy resin.

17. The method of claim 1 wherein the barrier layer further comprises a cross-linking agent.

18. The method of claim 1 the processing of each media layer to define a layer of the object further including printing the media layer to define the colour of the layer of the object.

19. The method of claim 1, the processing of each media layer further comprising:

printing the media layer to define the colour of the layer of the object;

wherein each of the steps of the processing are done in a common reference plane, wherein the plurality of media layers are processed and assembled at a build location to form the object.

20. The method of claim 1, the processing of each media layer further comprising printing of the media layer, and wherein each of the steps of the processing are done in a common reference plane; and wherein each media layer is processed at a build location, said build location defining the common reference plane for the processing of the media layer;

wherein the plurality of media layers are processed and assembled at the build location to form the object.

* * * * *